(12) United States Patent
Matsushima

(10) Patent No.: US 9,986,174 B2
(45) Date of Patent: May 29, 2018

(54) ELECTRONIC APPARATUS AND FOR NOTIFYING PREDETERMINED TIME POINT DURING MOVIE RECORDING AND METHOD FOR CONTROLLING THE SAME

(71) Applicant: CANON KABUSHIKI KAISHA, Tokyo (JP)

(72) Inventor: Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 14/976,292

(22) Filed: Dec. 21, 2015

(65) Prior Publication Data

US 2016/0191818 A1 Jun. 30, 2016

(30) Foreign Application Priority Data

Dec. 25, 2014 (JP) .................. 2014-263040

(51) Int. Cl.
| H04N 5/262 | (2006.01) |
| H04N 5/232 | (2006.01) |
| H04N 5/77 | (2006.01) |
| H04N 5/783 | (2006.01) |
| H04N 9/82 | (2006.01) |

(52) U.S. Cl.
CPC ....... *H04N 5/2621* (2013.01); *H04N 5/23245* (2013.01); *H04N 5/23293* (2013.01); *H04N 5/772* (2013.01); *H04N 5/783* (2013.01); *H04N 9/8211* (2013.01)

(58) Field of Classification Search
CPC .. H04N 5/2621; H04N 5/23293; H04N 5/772; H04N 5/783; H04N 5/23245; H04N 9/8211
See application file for complete search history.

(56) References Cited

U.S. PATENT DOCUMENTS

| 5,438,423 A * | 8/1995 | Lynch ............... G11B 27/032 348/E5.096 |
| 2003/0233657 A1* | 12/2003 | Takagi ............... G11B 27/034 725/58 |
| 2004/0143601 A1* | 7/2004 | Shinozaki ........... G11B 27/034 |

(Continued)

FOREIGN PATENT DOCUMENTS

JP 2013-81110 A 5/2013

*Primary Examiner* — Huy T Nguyen
(74) *Attorney, Agent, or Firm* — Canon U.S.A., Inc. IP Division

(57) ABSTRACT

A user easily recognizes, during the recording of a movie to which a predetermined effect is intended to be applied, a time point at which an effect-applied part starts or ends. An electronic apparatus includes an image capturing control unit configured to perform control to record a movie including at least a first recording period for applying a specific effect is applied and a second recording period to which the specific effect is not applied, and the second recording period is a period contiguous to the first recording period, in one recording period, and a display control unit configured to perform control to display, during recording the movie, an information display related to a time point at which the first recording period switches to the second recording period or a time point at which the second recording period switches to the first recording period, during recording the movie.

22 Claims, 14 Drawing Sheets

(56) References Cited

U.S. PATENT DOCUMENTS

2007/0025690 A1\* 2/2007 Nakata ............... H04N 5/44543
  386/212
2007/0110406 A1\* 5/2007 Nakagawa ........... G11B 27/034
  386/330

\* cited by examiner

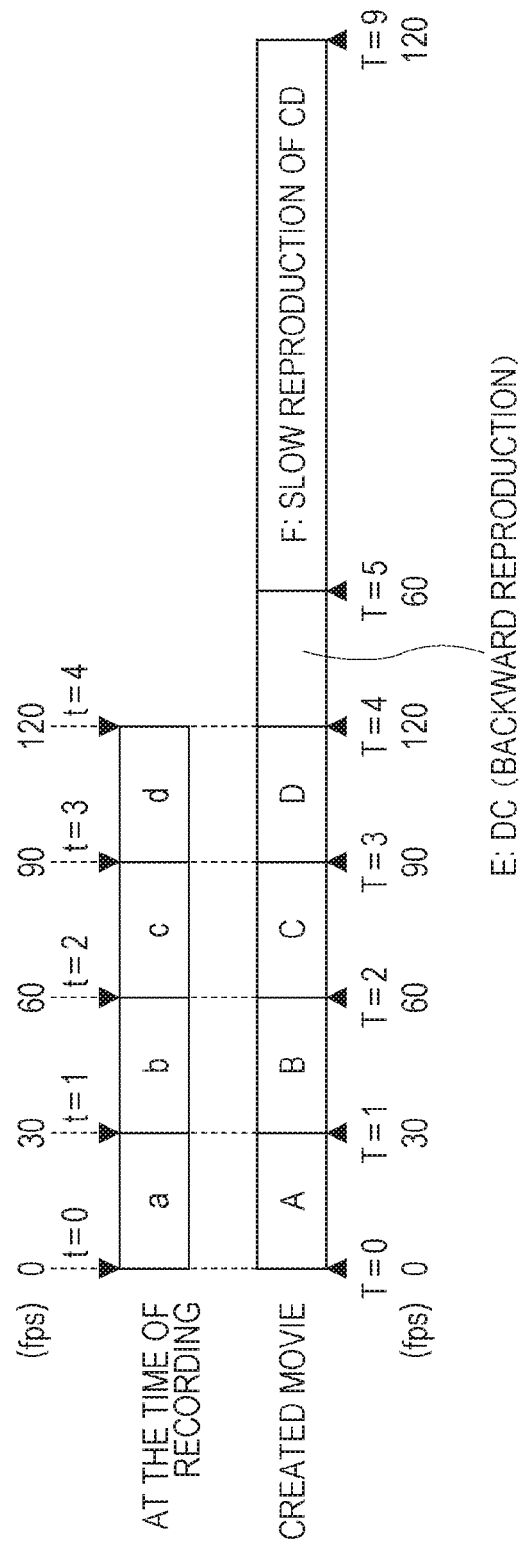

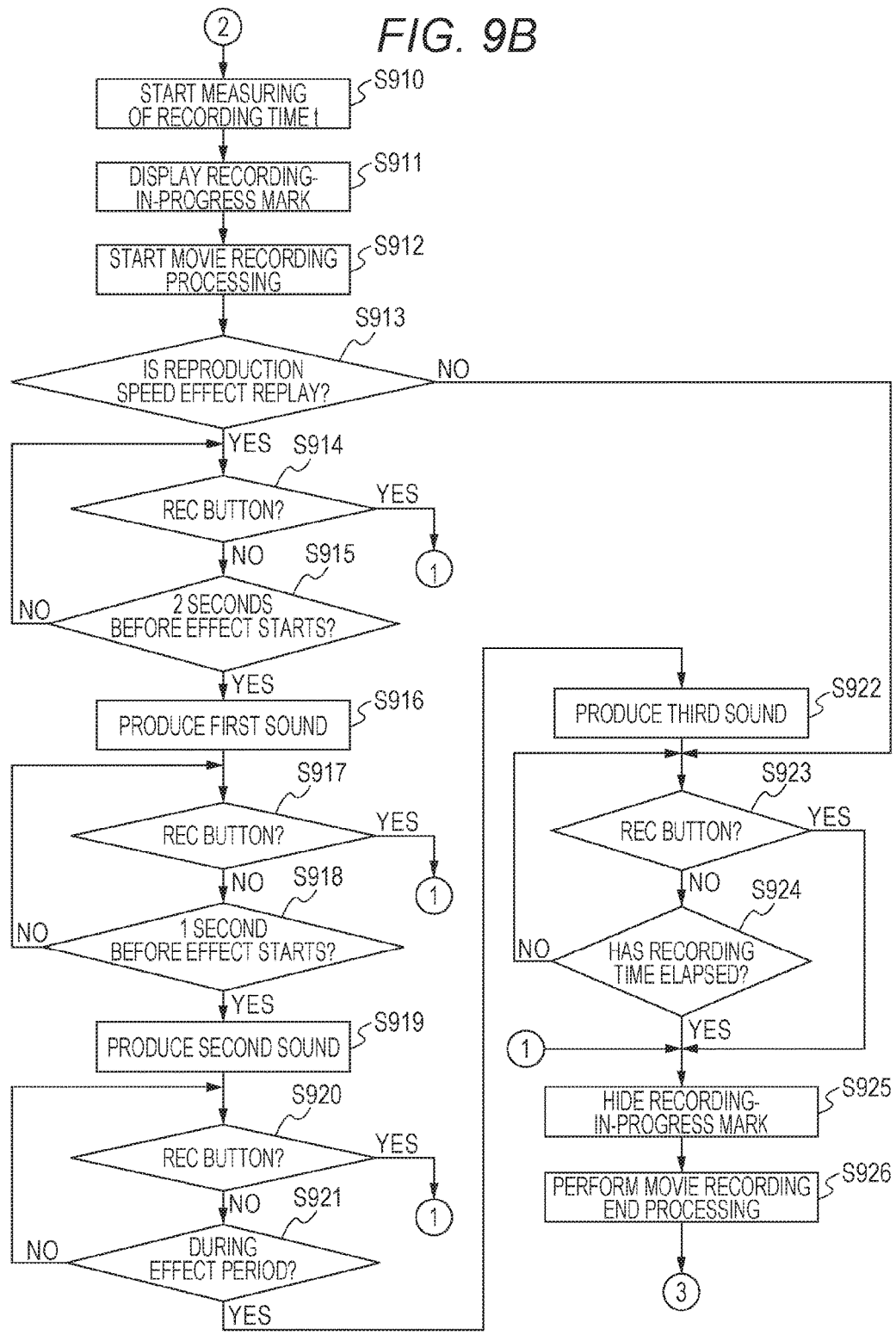

ELECTRONIC APPARATUS AND FOR NOTIFYING PREDETERMINED TIME POINT DURING MOVIE RECORDING AND METHOD FOR CONTROLLING THE SAME

BACKGROUND OF THE INVENTION

Field of the Invention

The present invention relates to a technique for notifying a predetermined time point during movie recording.

Description of the Related Art

There has been known a technique for displaying an elapsed time from a recording start and other types of information during movie recording.

Japanese Patent Application Laid-Open No. 2013-81110 describes recording a movie after performing image processing for adding a special effect to a captured image, and displaying an effect to be applied.

In the recording of a movie to which a predetermined effect is intended to be applied, by performing recording in accordance with the effect to be applied, a movie interesting for a user can be created. In Japanese Patent Application Laid-Open No. 2013-81110, although the user can identify whether a movie is recorded with a special effect applied, the user cannot identify to which period the special effect is to be applied. Thus, when recording a movie in accordance with a timing at which the effect is to be applied, the user cannot recognize the timing.

SUMMARY OF THE INVENTION

The present invention has been devised in view of the above issue, and aims to provide an electronic apparatus that enables the user to easily recognize, during the recording of a movie to which a predetermined effect is intended to be applied, a time point at which an effect-applied part starts or ends.

According to an aspect of the present invention, an electronic apparatus includes an image capturing control unit configured to perform control to record a movie including a first recording period to which a specific effect is applied and a second recording period to which the specific effect is not applied, and the second recording period is a period contiguous to the first recording period, in one recording period, and a display control unit configured to perform control to display, during recording the movie, an information display related to a time point at which the first recording period switches to the second recording period or a time point at which the second recording period switches to the first recording period, during recording the movie.

According to another aspect of the present invention, an electronic apparatus includes an image capturing control unit configured to perform control to record a movie including a first recording period to which a specific effect is applied and a second recording period to which the specific effect is not applied, and the second recording period is a period contiguous to the first recording period, in one recording period, and a sound production control unit configured to perform control on, during recording the movie, notification corresponding to a time point at which the first recording period switches to the second recording period or a time point at which the second recording period switches to the first recording period, during recording the movie, by producing sound.

According to yet another aspect of the present invention, an electronic apparatus includes an image capturing control unit configured to perform control to record a movie including a first recording period to which a specific effect is applied and a second recording period to which the specific effect is not applied, and the second recording period is a period contiguous to the first recording period, in one recording period, and a light emission control unit configured to perform control on, during recording the movie, notification corresponding to a time point at which the first recording period switches to the second recording period or a time point at which the second recording period switches to the first recording period, during recording the movie, by light emission.

Further features of the present invention will become apparent from the following description of exemplary embodiments (with reference to the attached drawings).

BRIEF DESCRIPTION OF THE DRAWINGS

FIG. 3 is a diagram illustrating a replay, which is an example of an effect that can be applied to a movie in the present invention.

FIGS. 5A-1, 5A-2, 5B-1 and 5B-2 are diagrams illustrating display examples of a display unit according to the present exemplary embodiment.

FIGS. 7A-1 through 7A-5 and 7B-1 through 7B-5 are diagrams illustrating display examples during recording according to the present exemplary embodiment.

FIGS. 8A, 8B, 8C-1 and 8C-2 are diagrams illustrating other display examples of a progress bar according to the present exemplary embodiment.

FIGS. 9A to 9C are flowcharts of replay recording according to a second exemplary embodiment.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

A preferred exemplary embodiment of the present invention will be described below with reference to the drawings.

<First Exemplary Embodiment>

Figure 1:
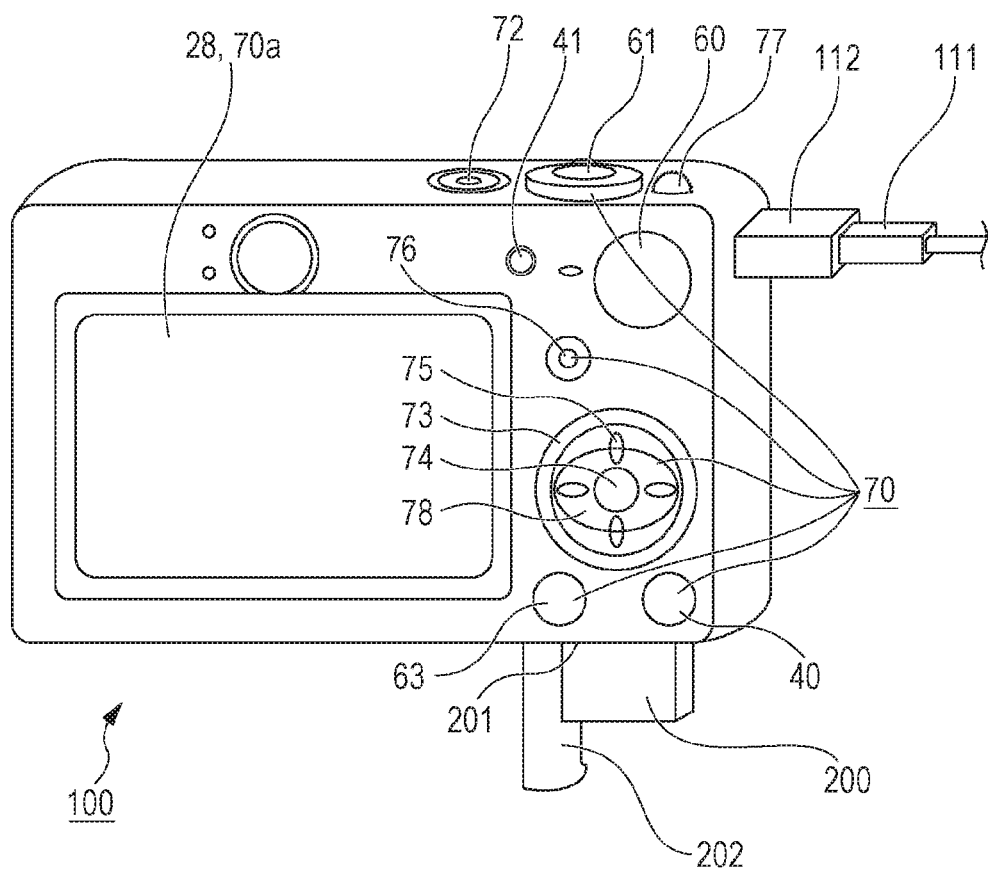
FIG. 1 is an external view of a digital camera serving as an example of an apparatus to which a configuration of an exemplary embodiment of the present invention is applicable.

FIG. 1 is an external view of a digital camera 100 serving as an example of an electronic apparatus according to the present invention. A display unit 28 is a display unit for displaying an image and various types of information. A touch panel 70a is provided so as to be superimposed on the display unit 28. The touch panel 70a receives a touch operation from a user.

A shutter button 61 is an operation unit for issuing an image capturing instruction. A mode dial 60 is an operation unit for switching various modes. A connector 112 is a connector for connecting, to the digital camera 100, a connection cable 111 for connecting to a personal computer (PC) or a printer, for example. An operation unit 70 is an operation unit including operation members such as various switches, buttons, and a touch panel that are used for receiving various operations from the user. A controller wheel 73 is a rotationally-operable operation member included in the operation unit 70. A power switch 72 is a push button for switching between power on and power off. A recording medium 200 is a recording medium such as a memory card and a hard disc. A recording medium slot 201 is a slot for storing the recording medium 200. Communication between the recording medium 200 stored in the recording medium slot 201 and the digital camera 100 becomes available to enable recording and reproduction. A lid 202 is a lid of the recording medium slot 201. FIG. 1 illustrates a state in which the lid 202 is opened, and part of the recording medium 200 is taken out from the recording medium slot 201 to be exposed.

A main dial 77 is a rotational operation member included in the operation unit 70. By rotating the main dial 77, the change or the like of a setting value such as a shutter speed and aperture can be made. In addition, by rotationally operating the main dial 77, a selected item can be shifted on a menu screen or the like. More specifically, if the main dial 77 is rotated right, a selected item is shifted rightward or downward. If the main dial 77 is rotated left, a selected item is shifted leftward or upward.

The controller wheel 73 is a rotationally-operable operation member included in the operation unit 70, and is used together with a directional button for instructing a selected item. When the controller wheel 73 is rotationally operated, an electrical pulse signal is generated according to an operation amount, and a system control unit 50 to be described below controls each unit of the digital camera 100 based on this pulse signal. Based on this pulse signal, an angle by which the controller wheel 73 has been rotationally operated, how many rotations have been made, and the like can be determined. In addition, the controller wheel 73 may be any operation member as long as a rotational operation can be detected. For example, the controller wheel 73 may be a dial operation member that generates a pulse signal when the controller wheel 73 itself rotates according to a rotational operation of the user. In addition, the controller wheel 73 may be an operation member including a touch sensor, and detecting a rotating operation of a finger of the user on the controller wheel 73 (so-called touch wheel), without the rotation of the controller wheel 73 itself.

A cross key 78 is a cross key (four-direction key) included in the operation unit 70. The upper, bottom, left, and right parts of the cross key 78 can be individually pushed in. An operation corresponding to a pressed part of the cross key 78 can be performed. An ISO button 75 is assigned to an up key of the cross key 78, and an ISO value can be changed by pressing the ISO button 75.

A SET button 74 is a push button included in the operation unit 70, and is used mainly for the determination of a selected item. A REC button 76 is included in the operation unit 70, and can issue a start instruction and an end instruction of movie recording. A reproduction button 63 is included in the operation unit 70, and is an operation button for switching between an image capturing mode and a reproduction mode. By pressing the reproduction button 63 during the image capturing mode, the image capturing mode shifts to the reproduction mode, so that the latest image among images recorded on the recording medium 200 can be displayed on the display unit 28.

A FUNC button 40 is a push button included in the operation unit 70, and is used mainly for calling a selectable/settable function or image capturing mode. A menu button 41 is a push button included in the operation unit 70, and can mainly display a menu screen for performing a setting according to a mode of the digital camera 100 that is set when the menu button 41 is pressed.

Figure 2:
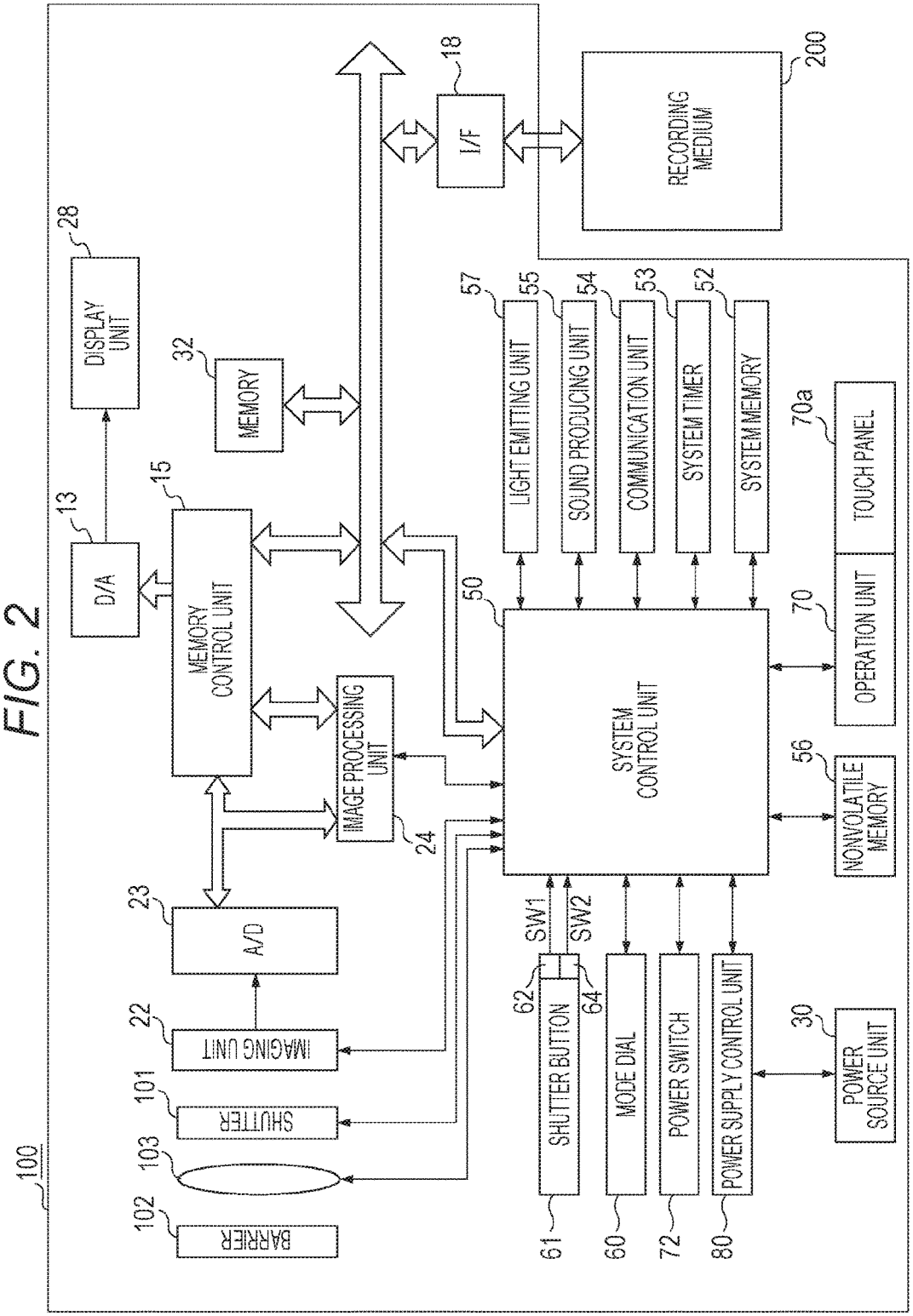
FIG. 2 is a block diagram illustrating a configuration example of a digital camera serving as an example of an apparatus to which a configuration of an exemplary embodiment of the present invention is applicable.

FIG. 2 is a block diagram illustrating a configuration example of the digital camera 100 according to the present exemplary embodiment.

In FIG. 2, an imaging lens 103 is a lens unit including a zoom lens and a focusing lens. A shutter 101 is a shutter having an aperture function. An imaging unit 22 is an image sensor including a charge-coupled device (CCD) sensor or a complementary metal-oxide semiconductor (CMOS) sensor for converting an optical image into an electrical signal. An analog-to-digital (A/D) converter 23 converts an analog signal into a digital signal. The A/D converter 23 is used for converting an analog signal output from the imaging unit 22 into a digital signal. A barrier 102 prevents an imaging system including the imaging lens 103, the shutter 101, and the imaging unit 22 from being dirtied or broken, by covering the imaging system (including the imaging lens 103) of the digital camera 100.

An image processing unit 24 performs resize processing such as predetermined pixel interpolation and reduction, and color conversion processing on data from the A/D converter 23 or data from a memory control unit 15. In addition, the image processing unit 24 performs predetermined calculation processing using data of a captured image, and the system control unit 50 performs exposure control and ranging control based on the obtained calculation result. As a result, through-the-lens (TTL) system autofocus (AF) processing, automatic exposure (AE) processing, and flash preliminary emission (EF) processing are performed. The image processing unit 24 further performs predetermined calculation processing using data of a captured image, and also performs TTL system automatic white balance (AWB) processing based on the obtained calculation result.

Output data from the A/D converter 23 is directly written into a memory 32 via the image processing unit 24 and the memory control unit 15, or via the memory control unit 15. The memory 32 stores image data obtained by the imaging unit 22 and converted by the A/D converter 23 into digital data, and image data to be displayed on the display unit 28. The memory 32 has a storage capacity sufficient for storing a predetermined number of still images, and a predetermined time of a movie and voice.

In addition, the memory 32 also serves as a memory (video memory) for image display. A digital-to-analog (D/A) converter 13 converts data for image display that is stored in the memory 32, into an analog signal to supply the analog signal to the display unit 28. In this manner, the image data for display that has been written in the memory 32 is displayed by the display unit 28 via the D/A converter 13. The display unit 28 performs display according to the analog signal from the D/A converter 13, on a display device such as a liquid crystal display (LCD). The digital signals having been once A/D-converted by the A/D converter 23 and stored in the memory 32 are D/A-converted by the D/A converter 13, and consecutively transferred to the display unit 28 for display, thereby enabling a function as an electronic viewfinder and live view display.

A nonvolatile memory 56 is a memory serving as an electrically erasable/recordable recording medium. For example, an electrically erasable programmable read-only memory (EEPROM) or the like is used. Constants for operating the system control unit 50, programs, and the like are stored in the nonvolatile memory 56. Here, the programs refer to computer programs for executing various flowcharts to be described below in the present exemplary embodiment.

The system control unit 50 controls the entire digital camera 100. By executing the programs recorded in the above-described nonvolatile memory 56, the system control unit 50 realizes each process in the present exemplary embodiment, which will be described below. A random access memory (RAM) is used as a system memory 52. Constants for operating the system control unit 50, variables, programs read from the nonvolatile memory 56, and the like are loaded into the system memory 52. In addition, the system control unit 50 also controls display by controlling the memory 32, the D/A converter 13, the display unit 28, and the like.

A system timer 53 is a time measuring unit for measuring a time used for various types of control or a time of a built-in clock.

The mode dial 60, the shutter button 61, and the operation unit 70 are operating units for inputting various operation instructions to the system control unit 50. The mode dial 60 switches an operation mode of the system control unit 50 to any of a still image recording mode, a movie recording mode, a reproduction mode, and the like. Examples of modes included in the still image recording mode include an automatic image capturing mode, an automatic scene determination mode, a manual mode, a various scene mode having different image capturing settings for respective captured scenes, a program AE mode, a custom mode, and the like. The mode dial 60 can directly switch the operation mode to any of these modes included in the menu screen. Alternatively, the switching operation may be performed in the following manner. First, the mode dial 60 once switches display to the menu screen. Then, the operation mode is switched to any of these modes included in the menu screen, using another operation member. Similarly, the movie recording mode may include a plurality of modes. A first shutter switch 62 is turned ON in the middle of an operation of the shutter button 61 provided on the digital camera 100, that is, by so-called half press thereof (i.e., an image capturing preparation instruction), thereby generating a first shutter switch signal SW1. According to the first shutter switch signal SW1, an operation of autofocus (AF) processing, automatic exposure (AE) processing, automatic white balance (AWB) processing, flash preliminary emission (EF) processing, or the like is started.

A second shutter switch 64 is turned ON upon completion of an operation of the shutter button 61, that is, by so-called full press thereof (i.e., an image capturing instruction), thereby generating a second shutter switch signal SW2. According to the second shutter switch signal SW2, the system control unit 50 starts operations of a series of image capturing processes (image capturing control) starting from the readout of a signal from the imaging unit 22 up to writing of image data onto the recording medium 200.

Operation members of the operation unit 70 are respectively assigned appropriate functions for each scene by, for example, selectively operating various functional icons displayed on the display unit 28, so as to act as various functional buttons. Examples of the functional buttons include an end button, a return button, an image feeding button, a jump button, a narrowing-down button, and an attribute change button. For example, if the menu button 41 is pressed, the menu screen for enabling various settings to be performed is displayed on the display unit 28. The user can intuitively perform various settings using the menu screen displayed on the display unit 28, a four-direction (up, down, left, and right) button, and the SET button 74.

The touch panel 70a that can detect touch performed on the display unit 28 is included as one operation member of the operation unit 70. The touch panel 70a and the display unit 28 can be integrally formed. For example, the touch panel 70a is configured to have light transmittance that does not disturb display performed on the display unit 28, and attached to the top layer of a display surface of the display unit 28. Then, an input coordinate on the touch panel 70a and a display coordinate on the display unit 28 are associated with each other. With this configuration, a graphical user interface (GUI) can be formed as if the user can directly operate a screen displayed on the display unit 28. The system control unit 50 can detect the following operation performed on the touch panel 70a or the state thereof.

The new touch of a finger or a stylus that has not been touched on the touch panel, i.e., the start of touch on the touch panel (hereinafter, referred to as a "Touch-Down").

The state in which a finger or a stylus touches the touch panel (hereinafter, referred to as a "Touch-On").

If the Touch-Down is detected, the Touch-On is simultaneously detected. After the Touch-Down, normally, the Touch-On continues to be detected until Touch-Up is detected.

The above operation and state, and a position coordinate where a finger or a stylus touches the touch panel are notified to the system control unit 50 via an internal bus. Based on the notified information, the system control unit 50 determines what type of operation has been performed on the touch panel. A touch panel of any of the following various types may be used: a resistive touch panel, a capacitive touch panel, a surface acoustic wave touch panel, an infrared touch panel, an electromagnetic induction type touch panel, an image recognition type touch panel, and an optical sensor type touch panel. Depending on the types, some touch panels detect touch upon detecting contact with the touch panels while the other touch panels detect touch upon detecting just the approach of a finger or a stylus to the touch panels even though the finger or the stylus is not in contact therewith. A touch panel of any type of them may be used.

A power supply control unit 80 includes, for example, a battery detecting circuit, a direct current (DC)-DC converter, and a switch circuit for switching a block to be supplied with power. The power supply control unit 80 detects whether or not a battery is attached, the type of the battery, and remaining battery capacity. In addition, the power supply control unit 80 controls, based on the detection result and an instruction from the system control unit 50, the DC-DC converter to supply necessary voltage to components including the recording medium 200 for necessary time period. A power source unit 30 includes a primary battery such as an alkaline battery and a lithium battery, a secondary battery such as a nickel-cadmium (NiCd) battery, a nickel-metal hydride (NiMH) battery, a lithium (Li) battery, and an alternating current (AC) adapter. A recording medium interface (I/F) 18 is an interface with the recording medium 200 such as a memory card and a hard disc. The recording medium 200 is a recording medium such as a memory card for recording a captured image. For example, the recording medium 200 is formed of a semiconductor memory, an optical disc, and magnetic disc. The power switch 72 is an operation member for switching the power of the digital camera 100 between ON and OFF.

A communication unit 54 is connected wirelessly or via a wired cable to transmit and receive a video signal, an audio signal, and the like. The communication unit 54 can be connected to a wireless local area network (LAN) and the Internet. The communication unit 54 can transmit an image (including a live view) captured by the imaging unit 22 and an image recorded on the recording medium 200. In addition, the communication unit 54 can receive image data and other various types of information from an external device.

A sound producing unit 55 is a sound producing unit such as a loudspeaker for producing sound (outputting audio). The sound producing unit 55 can issue a warning for a self-timer or the like, and can produce recorded audio during the reproduction of a movie.

A light emitting unit 57 is a light emitting unit such as a light-emitting diode (LED) light for emitting light for issuing a warning to the user, or for illuminating the periphery of the digital camera 100.

Figures 1, 7A:
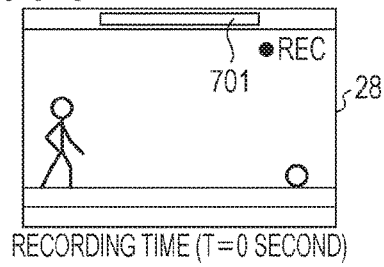
Figures 1, 7B:
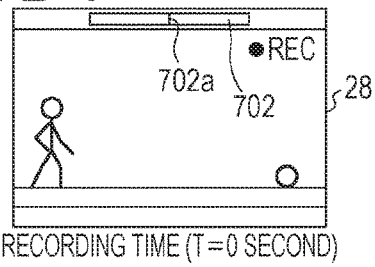
Figures 2, 7A:
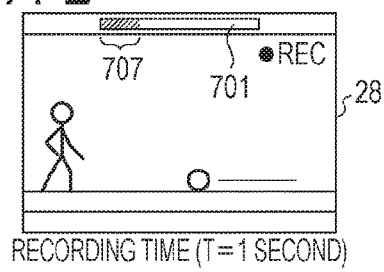
Figures 2, 7B:
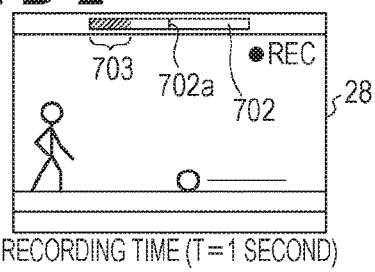
Figures 3, 7A:
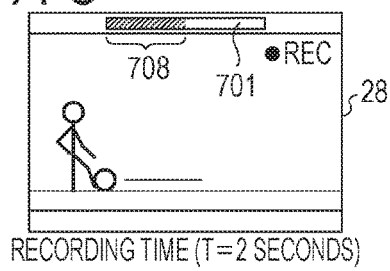
Figures 3, 7B:
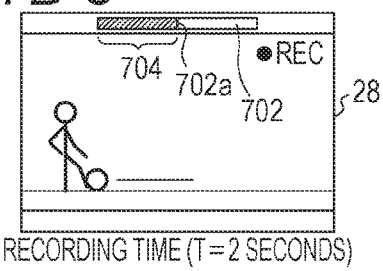

Next, replay recording will be described with reference to FIG. 3. The replay recording refers to a creation method of a movie reproduced so that a reproduction speed of the last 2 seconds varies, and the recording of a movie reproduced with a replay effect applied. In addition, in the replay recording and other multiplied speed recordings, the user can select a recording time from recording times of 4 seconds, 5 seconds, and 6 seconds. FIG. 3 is a diagram illustrating a reproduced part in a recording time and a reproduction time based on the lapse of time, for the recording of the replay recording and a movie to be created in a case where a recording time is 4 seconds. In addition, in FIG. 3, a movie at the time of recording is divided into four periods, and a frame rate during recording is indicated as 30 frames per second (fps). FIG. 3 illustrates how a movie recorded in each period is reproduced. A 1-second period from the recording start is a period a (1 to 30 frames), a 1-second period from 1 second to 2 seconds is a period b (31 to 60 frames), a 1-second period from 2 seconds to 3 seconds is a period c (61 to 90 frames), and a 1-second period from 3 seconds to 4 seconds is a period d (91 to 120 frames). Corresponding to the periods a and b, periods A and B each have a reproduction time of 1 second so that recording times and reproduction times become the same. Next, corresponding to the periods c and d, periods C and D each have a reproduction time of 1 second, which is the same as the recording time of 1 second. Furthermore, as indicated by a period E in a reproduction time, a movie (2 seconds) recorded in the periods c and d is reversely reproduced (so as to return from the recording time 4 seconds to 2 seconds), and at a double speed. Thus, the period E has a reproduction time of 1 second, which is half of 2 seconds. Then, as indicated in a period F, a movie recorded in the periods c and d is further reproduced along the same time axis as that when the movie has been recorded, and at a ½ reproduction speed. Thus, the period F has a reproduction time of 4 seconds, which is double of 2 seconds. More specifically, first, 1 to 120 frames are sequentially reproduced (reproduced in the order of 1, 2, 3, . . . 119, 120), and in the period E, 60 to 120 frames are reversely reproduced at a double speed (reproduced in the order of 120, 118, 116 . . . 64, 62, 60). Furthermore, in the period F, 60 to 120 frames are slow-reproduced (reproduced in the order of 60, 60, 61, 61, . . . 119, 119, 120, 120). In other words, among the periods during image capturing (during recording), the periods c and d correspond to periods to which a replay effect is applied. In this manner, by changing a reproduction speed of a part of a reproduction period of a recorded movie, and reversely reproducing a movie (reverse reproduction), a movie including an effect interesting for the user is created. In addition, by timely recording a movie in accordance with the recording periods c and d in which a reproduction speed is changed, a movie more interesting for the user is obtained. FIG. 3 illustrates an example in which a period to which a certain special effect (replay in this example) is applied is the last 2 seconds (among the recording periods). Alternatively, the period may be a mid period among the recording periods. Furthermore, the number of times an effect is applied is not limited to one, and a period to which an effect is applied a plurality of times may be included.

The replay recording is one of effects of changing a reproduction speed included in short movie recording. In the short movie recording that can be performed by the digital camera 100, a recording time can be selected from 4 seconds, 5 seconds, and 6 seconds. Furthermore, a reproduction speed can be selected from slow (½ times), normal speed (1 time), double speed (2 times), and replay (including reverse double speed reproduction and slow reproduction). If recording is performed after a recording time and a reproduction speed are preset to setting values desired by the user, a movie including a desired effect is created.

In addition, in the slow reproduction, the normal speed reproduction, and the double speed reproduction that are effects other than the replay effect, all the recorded periods are reproduced at the same reproduction speed. These effects do not reproduce a part of the recorded periods at a different reproduction speed from that of the other periods in the same movie.

Figure 4A:
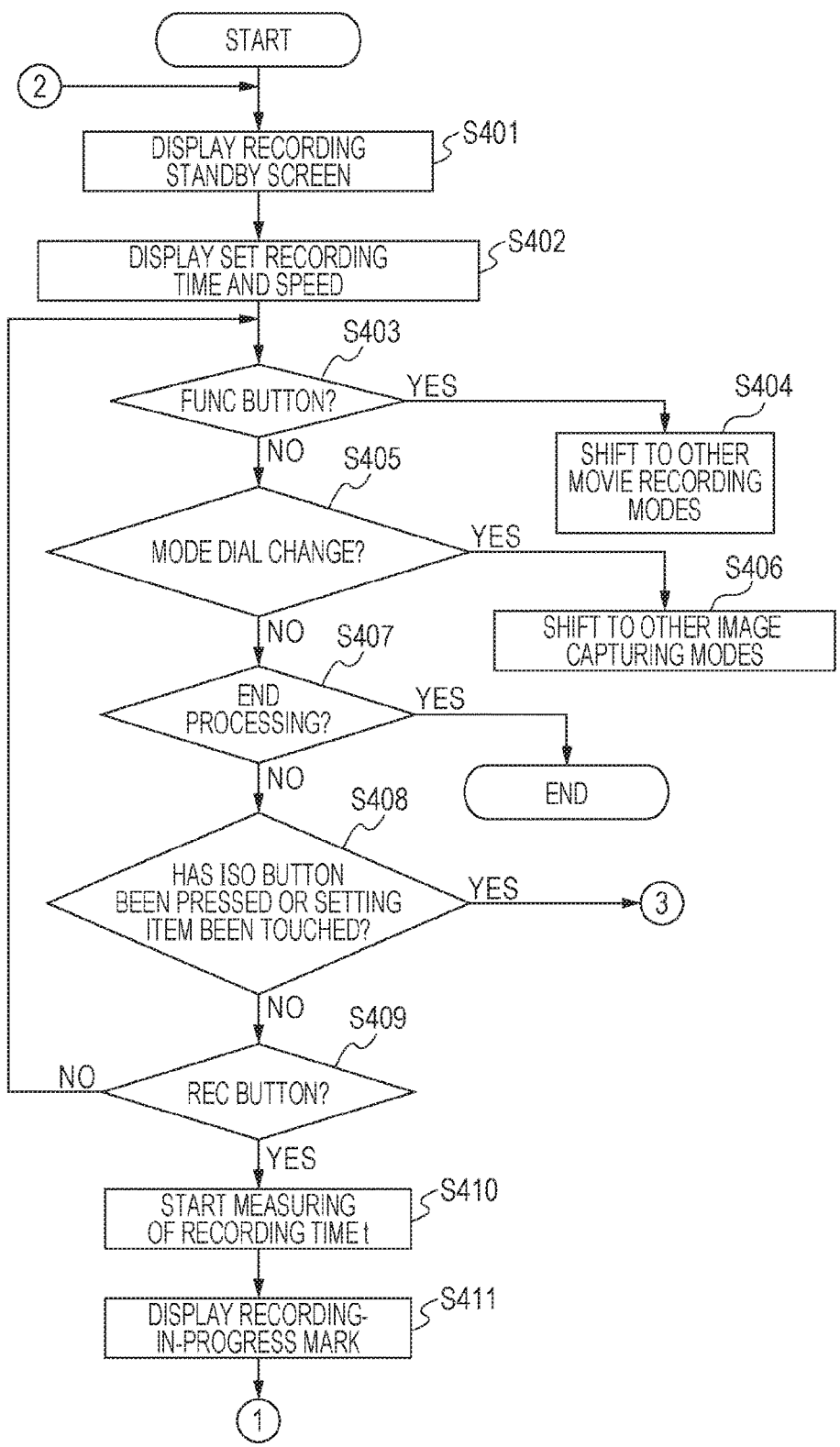
FIGS. 4A to 4D are flowcharts of replay recording according to a first exemplary embodiment.
Figure 4B:
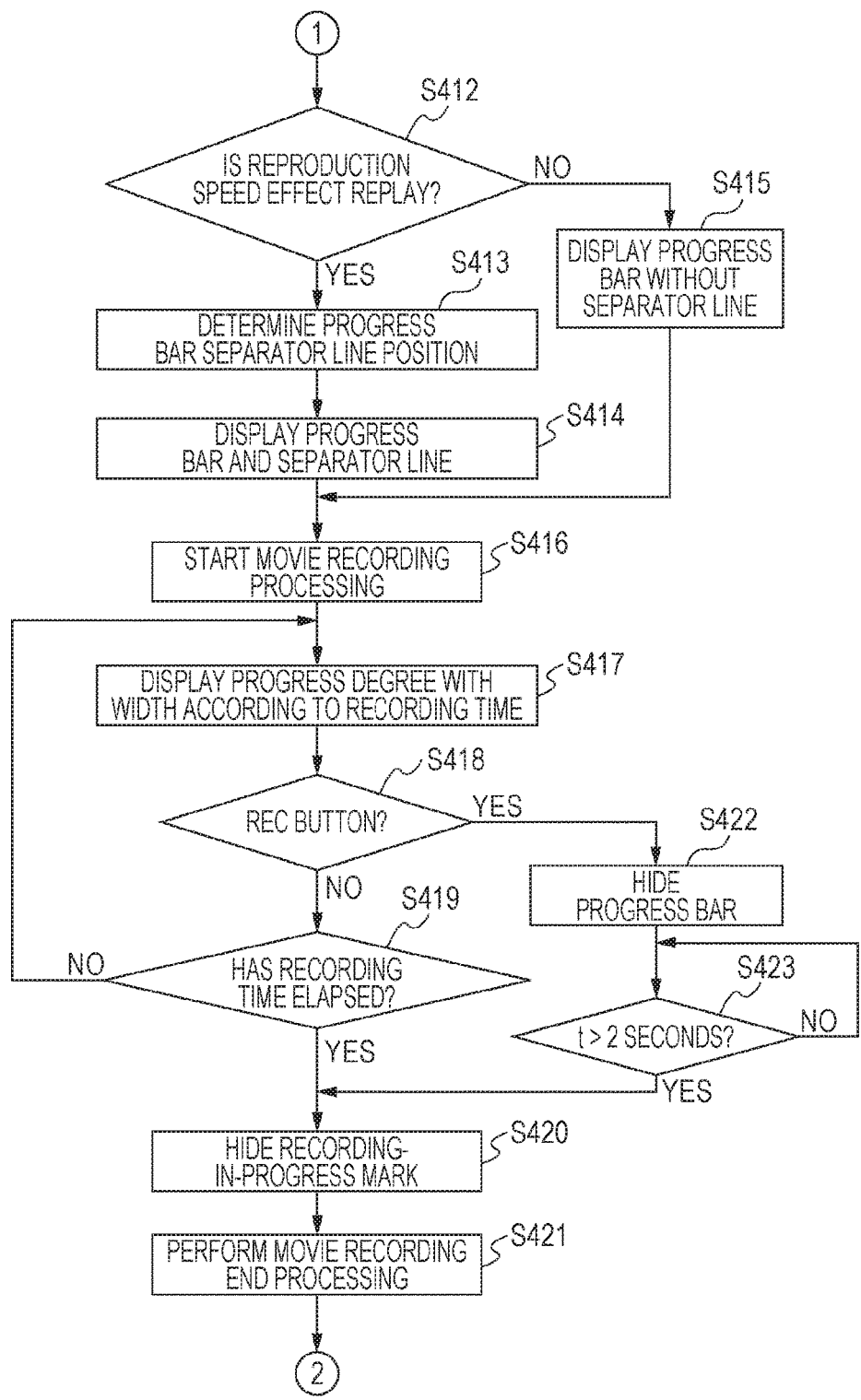
Figure 4C:
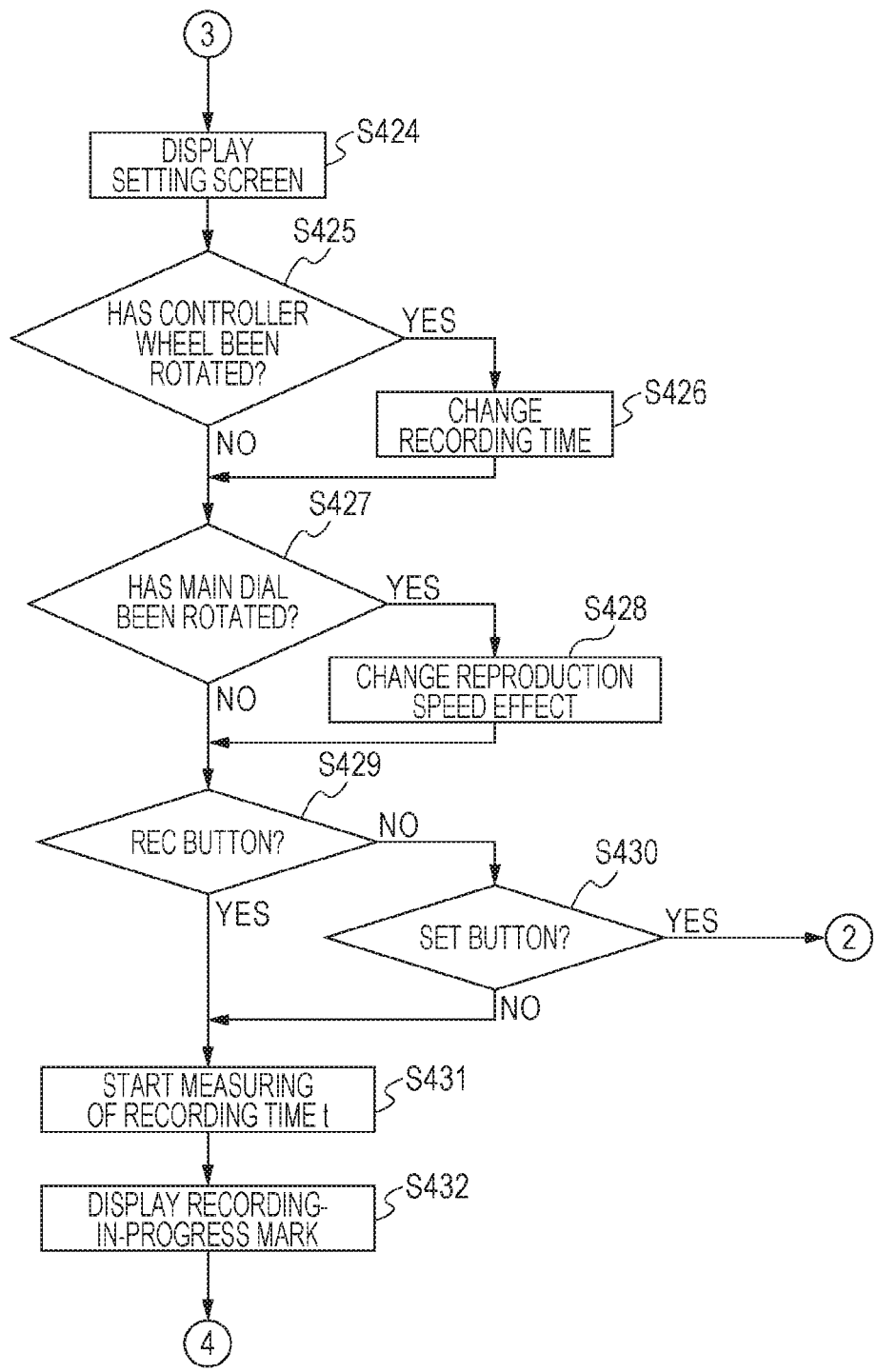
Figure 4D:
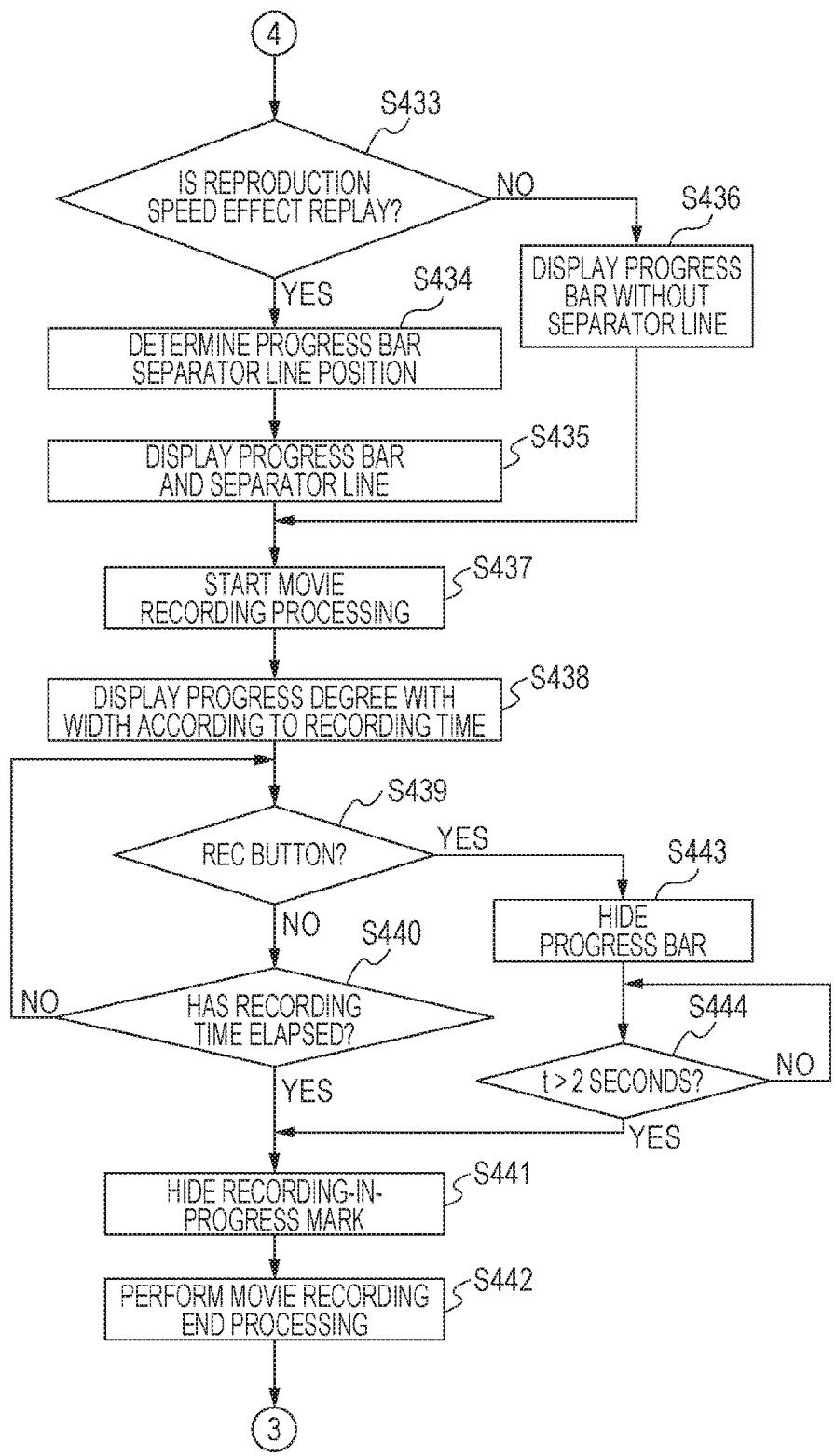

The flow of the replay recording according to the first exemplary embodiment will be described with reference to FIGS. 4A to 4C. Before the flow illustrated in FIGS. 4A to 4C is started, the digital camera 100 is turned on, and a movie mode is set by rotationally operating the mode dial 60. Furthermore, the FUNC button 40 is pressed, and a short clip movie recording mode for recording a short movie is selected. Upon the selection of the short clip movie recording mode, the flow illustrated in FIGS. 4A to 4C is started. The processing is realized by loading a program recorded in the nonvolatile memory 56, into the system memory 52, and executing the program by the system control unit 50.

Figures 1, 5A:
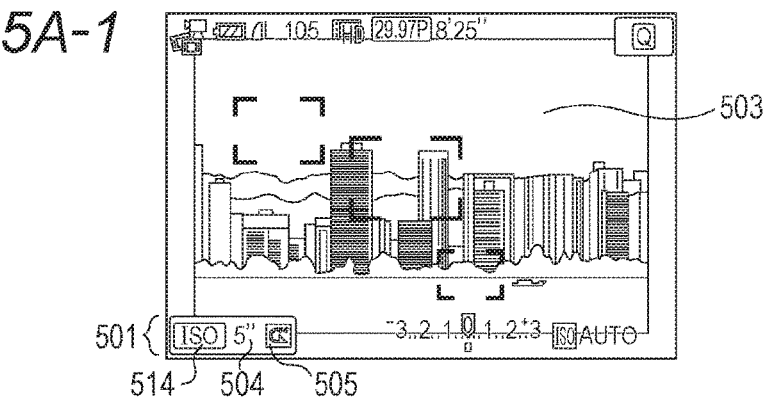
Figures 2, 5A:
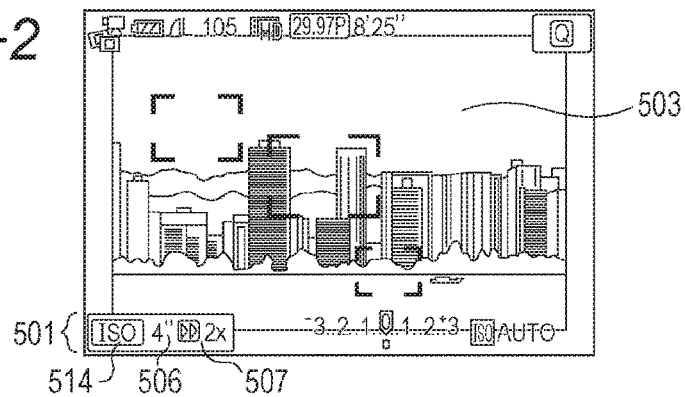

In step S401, the system control unit 50 displays a recording standby screen (live view screen) on the display unit 28. As illustrated in FIGS. 5A-1 and 5A-2, the system control unit 50 displays a live view image 503. When the recording standby screen is displayed, recording can be performed in response to the reception of a recording instruction.

In step 3402, the system control unit 50 displays, on the display unit 28, setting values or setting items of a recording time and a reproduction speed that are currently set. Among effect items 501 illustrated in FIG. 5A-1, a recording time 504 indicates that the currently-set recording time is 5 seconds, and a reproduction speed (effect) setting 505 indicates that replay is currently set. In addition, an ISO button display 514 is a display for indicating that an ISO value setting can be changed by pressing the ISO button 75. In FIG. 5A-2, among the effect items 501, a recording time 506 indicates that the currently-set recording time is 4 seconds, and a reproduction speed setting 507 indicates that a double speed is currently set.

In step S403, the system control unit 50 determines whether the FUNC button 40 has been pressed. If the system control unit 50 determines that the FUNC button 40 has been pressed (YES in step S403), the processing proceeds to step S404. If not (NO in step S403), the processing proceeds to step S405. If the FUNC button 40 is pressed when any mode of movie recording modes is selected, the other movie recording modes become selectable.

In step S404, the system control unit 50 shifts the screen to a screen for selecting other movie recording modes. Other movie recording modes include a manual recording, an exposure compensation recording, and the like. If the short clip movie recording mode is selected again in this step, the processing returns to step S401. In the other movie recording modes, a recording time may not be preset. In addition, if a recording time is not set, a progress bar to be described below is not displayed. Instead, an elapsed time after the recording start is displayed on the display unit 28. The details of processing in the other movie recording modes will be omitted.

In step S405, the system control unit 50 determines whether the mode dial 60 has been operated. If the system control unit 50 determines that the mode dial 60 has been operated (YES in step S405), the processing proceeds to step S406. If not (NO in step S405), the processing proceeds to step S407.

In step S406, the system control unit 50 shifts the mode to any of other image capturing modes. Other image capturing modes include a manual mode including a still image capturing mode, a program mode, a star mode, and the like. In other image capturing modes, if the movie mode is selected again and the short clip movie recording mode is further selected, the processing returns to step S401.

In step S407, the system control unit 50 determines whether end processing has been performed. If the system control unit 50 determines that the end processing has been performed (YES in step S407), the recording mode is ended. If not (NO in step S407), the processing proceeds to step S408. The end processing includes switching to a reproduction mode by the press of the reproduction button 63, switching to the menu screen by the press of the menu button 41, power OFF by the press of the power switch 72, or the like.

In step S408, the system control unit 50 determines whether the ISO button 75 has been pressed or the effect item 501 has been touched, and a display instruction of a setting part of effect items has been issued. If the system control unit 50 determines that the display instruction of the setting part of the effect items has been issued (YES in step S408), the processing proceeds to step S424. If not (NO in step S408), the processing proceeds to step S409.

In step S409, the system control unit 50 determines whether the REC button 76 has been pressed. If the system control unit 50 determines that the REC button 76 has been pressed (a movie recording start instruction has been received)(YES in step S409), the processing proceeds to step S410. If not (NO in step S409), the processing returns to step S403.

In step S410, the system control unit 50 starts measuring of a recording time t by the system timer 53.

Figure 6A:
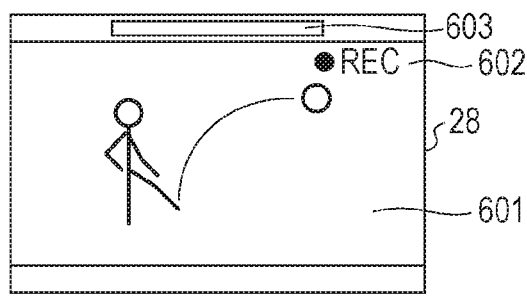
FIGS. 6A to 6D are diagrams illustrating display examples of a progress bar according to the present exemplary embodiment.
Figure 6B:
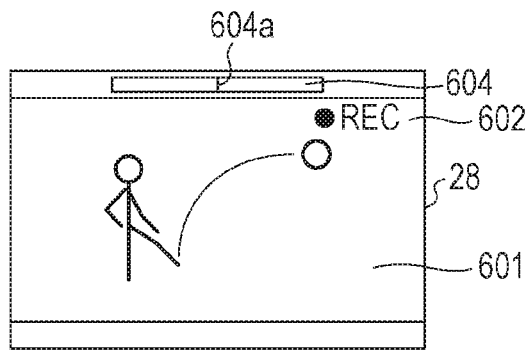
Figure 6C:
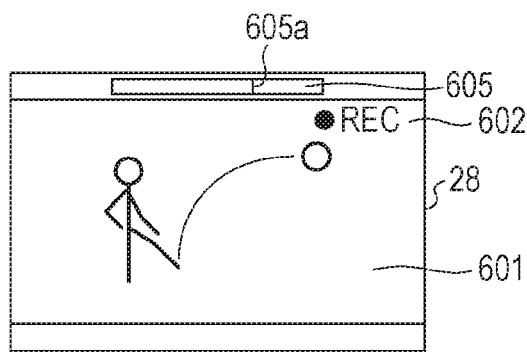
Figure 6D:
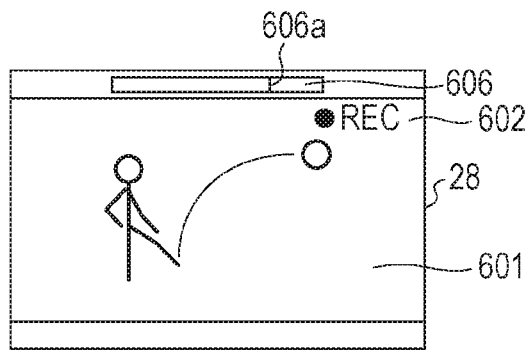

In step S411, the system control unit 50 displays a recording-in-progress mark. As illustrated in FIGS. 6A to 6D, the system control unit 50 displays, on the display unit 28, a recording-in-progress mark 602 indicating that recording is in progress. FIGS. 6A to 6D each illustrate a display example of the display unit 28 during recording. FIG. 6A illustrates a display example during recording (other than replay recording) (t=0) in a case where a reproduction speed effect other than replay is set. FIGS. 6B to 6D each illustrate a display example during recording (t=0) in a case where a replay effect is set. In an image 601 during recording, an image currently being recorded is displayed.

In step S412, the system control unit 50 determines whether a currently-set reproduction speed effect is replay. If the system control unit 50 determines that the currently-set reproduction speed effect is replay (YES in step S412), the processing proceeds to step S413. If not (NO in step S412), the processing proceeds to step S415.

Figures 4, 7A:
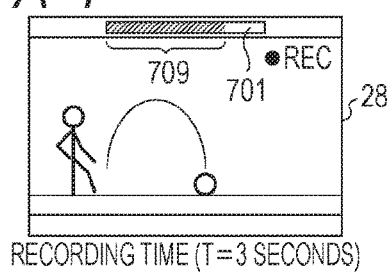
Figures 4, 7B:
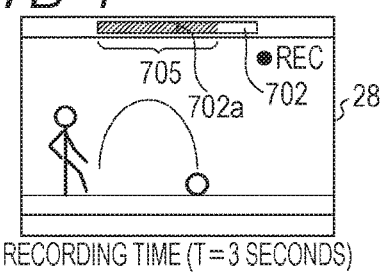
Figures 5, 7A:
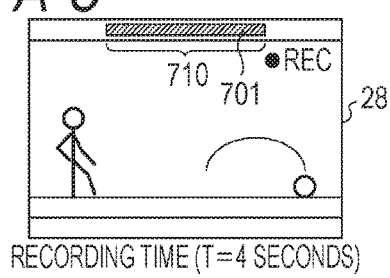
Figures 5, 7B:
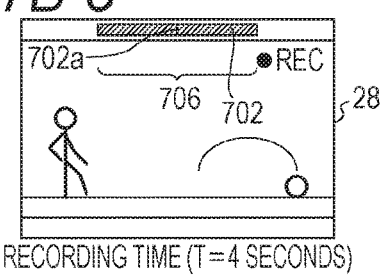

In step S413, the system control unit 50 determines a separator line position of a progress bar (bar display). The progress bar is displayed for indicating a progress degree of recording (a ratio of an elapsed time from the recording start) with respect to a preset recording time. In the present exemplary embodiment, a display appearance changes from the left side to the right side according to the elapsed time from the recording start (progress degree). FIGS. 7A-1 to 7A-5 and 7B-1 to 7B-5 each illustrate an example of the display unit 28 during movie recording in a case where a recording time is set to 4 seconds. FIGS. 7A-1 to 7A-5 each illustrate the display unit 28 according to an elapsed time from the recording start in a case where a recording mode other than the replay recording is selected. FIGS. 7B-1 to 7B-5 each illustrate the display unit 28 according to an elapsed time from the recording start in a case where the replay recording is selected. When a recording time t is 0 as illustrated in FIGS. 7A-1 and 7B-1, progress bars 701 and 702 are displayed in white. If the set recording time elapses, as indicated by a progress 710 in FIGS. 7A-5 and a progress 706 in FIG. 7B-5, the display appearance of the progress bars 701 and 702 changes so that all parts are shaded in black. In this manner, by changing a display appearance of a part of a progress bar that corresponds to an elapsed time, the user can recognize a ratio of the elapsed time from the recording start and a ratio of a remaining recording time, with respect to the set recording time. The display of a progress degree will be described below in the description of step S417.

As in a progress bar 604 illustrated in FIG. 6B, in a progress bar of the replay recording, a separator line 604a is displayed. A separator line is a display for indicating a time point at which recording of a part reproduced with a changed reproduction speed is started. FIG. 6B illustrates a case where the recording time is 4 seconds. In the present exemplary embodiment, the last 2 seconds of a movie is reproduced with a changed reproduction speed, regardless of the recording time. Thus, the separator line 604a is displayed at a position dividing the progress bar 604 into two (a time point at which a reproduction speed effect is switched). In the progress bar 604, the left side from the separator line 604a indicates a recording period of a part reproduced with a reproduction speed unchanged, and the right side from the separator line 604a indicates a recording period of a part to which the effect is applied so as to be reproduced with a changed reproduction speed. The separator line 604a serves as an index for indicating a time point in the progress bar 604 at which the effect is switched, and is an information display related to an effect-applied period. In addition, a progress bar 605 illustrated in FIG. 6C indicates a progress bar in a case where the recording time is 5 seconds, and a progress bar 606 illustrated in FIG. 6D indicates a progress bar in a case where the recording time is 6 seconds. In these progress bars 605 and 606, the positions of the respective separator lines differ from each other. While the description is given of the case where the recording time is 4 seconds in the present exemplary embodiment, the width (length, size) of a progress bar remains the same even in a case where the recording time is 5 seconds or 6 seconds. Furthermore, a period reproduced with the effect applied is the last 2 seconds regardless of the recording time. Thus, in a case where the recording time is 5 seconds, a separator line 605*a* is displayed at a position 3/5 from the left and 2/5 from the right. In the progress bar 605, the left side of the separator line 605*a* indicates a recording period of a part reproduced with a reproduction speed unchanged, and the right side from the separator line 605*a* indicates a recording period of a part to which the effect is applied so as to be reproduced with a changed reproduction speed. In addition, in the present exemplary embodiment, the progress degree of recording is indicated in such a manner as to move from the left of the progress bar to the right. Thus, a separator line indicating the last 2 seconds is displayed at a position 2/5 from the right, but this is not a limiting case. In a case where the recording time is 6 seconds, a separator line 606*a* is displayed at a position 4/6 from the left and 2/6 from the right. In the progress bar 606, the left side of the separator line 606*a* indicates a recording period of a part reproduced with a reproduction speed unchanged, and the right side from the separator line 606*a* indicates a recording period of a part to which the effect is applied so as to be reproduced with a changed reproduction speed. In this manner, in step S413, a position at which a separator line is displayed is determined according to a recording time. Based on the display of such a separator line, the user can recognize a length of time until the effect-applied period starts (or ends).

In step S414, the system control unit 50 displays a progress bar together with a separator line determined in step S413. For example, as illustrated in FIG. 6B, the system control unit 50 displays the progress bar 604 in which the separator line 604*a* is indicated. By displaying a progress bar together with a separator line in this manner, the user can identify when the effect-applied period is recorded. In addition, the user can identify the start timing of a period to which an effect different from that of the other parts is applied, or a sole specific period to which an effect is applied while no effect is applied to the other parts (both regarded as a period to which a specific effect is applied). Thus, the user can perform recording in accordance with the start timing.

In addition, in the present exemplary embodiment, a period to which a specific effect is applied to corresponds to the last 2 seconds of the recording time. Thus, the end of recording of the period to which the specific effect is applied is the same as the end of movie recording. That is, the end of the progress bar is the same as a part indicating the end point of the period to which the specific effect is applied. If, however, the end point of the movie recording differs from the end point of the period to which the specific effect is applied, the end point of the period to which the specific effect is applied is displayed by another separator line (index). Based on this separator line, the user can identify by when the movie recording of the effect-applied part needs to be finished. In addition, the user can perform recording so that a movie including a desired effect is created, while recognizing the period to which the specific effect is applied when performing recording. Based on the position of a separator line, the user can identify which period in the entire recording time corresponds to the period to which the specific effect is applied (the length of the period to which the specific effect is applied and the position of the period in the recording time). Thus, it becomes easier to intuitively recognize the flow and the configuration of recording.

The separator line may not be necessarily displayed inside the progress bar. The start point of the effect-applied period in the progress bar may be indicated by an arrow. When it is undesirable to superimpose a display icon on an image being displayed, or when a display area is small, if the separator line is displayed inside the progress bar, the effect-applied period can be shown to the user without increasing the area superimposed on the image.

In step S415, the system control unit 50 displays a progress bar. As indicated by a progress bar 603 illustrated in in FIG. 6A and the progress bar 701 illustrated in FIGS. 7A-1 to 7A-5, if a reproduction speed effect is not replay recording, a progress bar without a separator line is displayed. In short movie recording other than the replay recording, all the periods of a recorded movie is reproduced at the same reproduction speed without the reproduction speed being halfway switched. In addition, also in a case where a reproduction speed effect is not replay recording, the width of the progress bar remains the same regardless of a recording time.

In step S416, the system control unit 50 starts movie recording processing. An image obtained by the imaging unit 22 is recorded onto the recording medium 200 as a movie. At this time, a movie file may be created after processing the movie so that the movie is reproduced at a set reproduction speed. Alternatively, a captured movie may be recorded without changing a speed, and reproduction information may be recorded in association with the movie so that the movie is reproduced at the set speed.

In step S417, the system control unit 50 displays a progress degree on the progress bar with a width according to a recording time. In step S417, the progress degree is determined according to the set recording time, regardless of a set reproduction speed effect. If the recording time is 4 seconds, a display appearance of a 1/4 part changes after 1 second from the recording start, a display appearance of a 2/4 part changes after 2 seconds from the recording start, and a display appearance of a 3/4 part changes after 3 seconds from the recording start, so that a display appearance of the entire width of the progress bar changes in 4 seconds. In this manner, by indicating a ratio of an elapsed time from the recording start with respect to the set recording time, the user can perform recording while intuitively recognizing the progress degree of the recording. As described above in step S413, FIGS. 7A-1 to 7A-5 and 7B-1 to 7B-5 each illustrate a change of a display appearance of a progress bar according to an elapsed time from the recording start. In short movie recording, a progress bar is displayed regardless of whether the recording mode is the replay recording or any of other recording modes. In FIGS. 7A-1 to 7A-5, a ratio of an elapsed time from the recording start with respect to the set recording time can be seen. Progresses 707 to 710 respectively illustrated in FIGS. 7A-2 to 7A-5 each illustrate a progress degree (progress ratio) of recording. The display in a progress bar that indicates a progress degree progresses by a predetermined amount every predetermined time, and the length of a part of which a display appearance changes becomes longer according to an elapsed time. In addition, in FIGS. 7B-1 to 7B-5, ratios with respect to the set recording time of an elapsed time from the recording start, a time until the period to which the specific effect is applied is started, and a time until the period to which the specific effect is applied ends can be seen. For example, in FIG. 7B-2, it can be seen from a progress 703 that the recording of ¼ of the set recording time has already been ended, and that the time until the period to which the specific effect is applied starts is about the same as ¼ of the entire recording time or an elapsed time from the recording start to the present time. The right end part of the progress 703 indicates the elapsed time from the movie recording start to the present time (i.e., the present time point). In FIG. 7B-3, it can be seen from a progress 704 that the recording of ½ of the set recording time has already been ended, and that the period to which the specific effect is applied has just started. At this time, if a timing at which the user intends to apply the effect (e.g., a motion of a subject) is not synchronized with an actual start timing of the part to which the specific effect is applied, the user can immediately recognize that the timing has been off. In this manner, by displaying a separator line 702*a*, the user can check whether the recording has succeeded, without viewing a created movie. Thus, the user can immediately retake a movie. In FIG. 7B-4, it can be seen from a progress 705 that the recording of ¾ of the set recording time has already been ended, that the period to which the specific effect is applied is currently being recorded, and furthermore, that a time until the recording end of the period to which the specific effect is applied is ¼ of the recording time. Thus, the user can recognize that a movie having a desired effect can be created by finishing, in the remaining period, the recording of the part to which the effect is intended to be applied. In FIG. 7B-5, it can be seen from a progress 706 that the recording of the set recording time has been ended. In this manner, in the replay recording, by displaying a progress bar, a separator line, and a progress degree, the user can recognize the progress degree of recording and the period to which the specific effect is applied.

In step S418, the system control unit 50 determines whether the REC button 76 has been pressed. If the system control unit 50 determines that the REC button 76 has been pressed (YES in step S418), the processing proceeds to step S422. If not (NO in step S418), the processing proceeds to step S419.

In step S419, the system control unit 50 determines whether the recording time t started to be measured from step S410 has reached the set recording time. If the system control unit 50 determines that the set recording time has elapsed (YES in step S419), the processing proceeds to step S420. If not (NO in step S419), the processing returns to step S417. The system control unit 50 continues to display the progress in step S417 until the recording time elapses, or the movie recording is canceled.

In step S420, the system control unit 50 hides the recording-in-progress mark to indicate that the movie is not being recorded, i.e., that the movie recording has ended. At this time, the system control unit 50 hides the progress bar (if the progress bar is not hidden).

In step S421, the system control unit 50 performs movie recording end processing. More specifically, the system control unit 50 performs compression processing of the recorded movie, creates a thumbnail and the like, and records the compressed movie and the created thumbnail together with a recording date and time.

In step S422, the system control unit 50 hides the progress bar.

In step S423, the system control unit 50 determines whether the elapsed time from the recording start in S410 is longer than 2 seconds. If the system control unit 50 determines that 2 seconds or more have elapsed from the recording start (YES in step S423), the processing proceeds to step S420. If not (NO in step S423), the system control unit 50 waits until 2 seconds elapse. In response to the lapse of 2 seconds, the processing proceeds to step S420, in which the system control unit 50 hides the recording-in-progress mark. In the present exemplary embodiment, even if a recording end instruction is received, the movie recording is not immediately ended until 2 seconds elapse from the recording start. This is because, when a reproduction speed can be changed to a double speed or the like, if a movie having too short time is recorded, a movie file to be reproduced in further shorter time than the recording time is completed. In the case of a movie having too short reproduction time, it may be difficult for the user to determine later what has been recorded in the movie. In addition, even if the user erroneously presses the REC button 76 in succession (issues a recording stop instruction), the recording is continued for at least 2 seconds. Thus, the user can check the recorded content.

Steps S424 to S444 indicate a flow in a case where a setting part (setting screen) of effect items is displayed.

Figures 1, 5B:
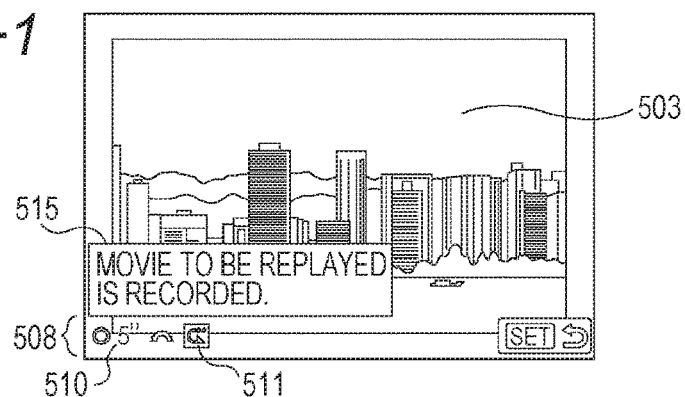
Figures 2, 5B:
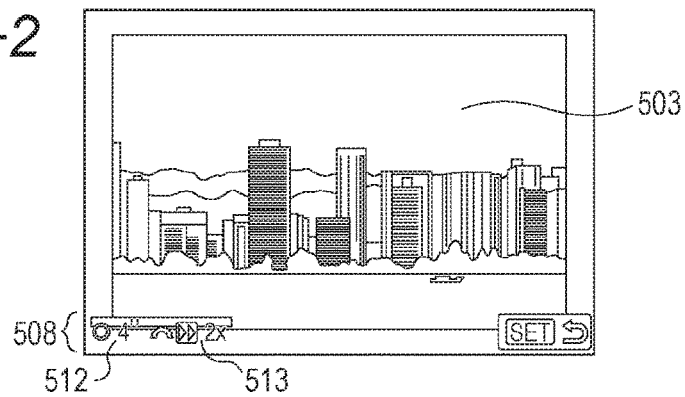

In step S424, the system control unit 50 displays the setting part of effect items on the display unit 28. FIG. 5B-1 illustrates a display example of the setting screen of effect items. In a setting part 508 of effect items, a recording time setting 510 indicates that the currently-set recording time is 5 seconds, and a reproduction speed setting 511 indicates that replay is currently set. In addition, at the left part of the recording time setting 510, a display icon indicating the controller wheel 73 is displayed. This indicates that the recording time setting is changeable according to an operation to the controller wheel 73. Similarly, at the left part of the reproduction speed setting 511, a display icon indicating the main dial 77 is displayed. This indicates that the reproduction speed setting is changeable according to an operation to the main dial 77. In addition, while the live view image 503 is displayed even when the setting part 508 is displayed as illustrated in FIG. 5B-1, only the setting part 508 may be displayed.

In step S425, the system control unit 50 determines whether the controller wheel 73 has been rotationally operated. If the system control unit 50 determines that the controller wheel 73 has been rotationally operated (YES in step S425), the processing proceeds to step S426. If not (NO in step S425), the processing proceeds to step S427.

In step S426, the system control unit 50 changes the recording time from the currently-set recording time to a setting value located in a direction according to a rotation direction of the controller wheel 73. If the controller wheel 73 is rotated left when the displayed recording time is 5 seconds as illustrated in FIG. 5B-1, the recording time is set to 4 seconds, and if the controller wheel 73 is rotated right, the recording time is set to 6 seconds. When the recording time is set to 4 seconds, the recording time setting 510 switches to a display indicating that the recording time is 4 seconds, as in a recording time setting 512 of the setting part 508 of effect items illustrated in FIG. 5B-2. At this time, a description display 515 for describing the set reproduction speed effect may be displayed.

In step S427, the system control unit 50 determines whether the main dial 77 has been rotationally operated. If the system control unit 50 determines that the main dial 77 has been rotationally operated (YES in step S427), the processing proceeds to step S428. If not (NO in step S427), the processing proceeds to step S429.

In step S428, the system control unit 50 changes the reproduction speed from the currently-set reproduction speed to a setting value according to a rotation direction of the main dial 77. If the main dial 77 is rotated left when the reproduction speed is replay as illustrated in FIG. 5B-1, the reproduction speed is set to double speed, and if the main dial 77 is rotated right, the reproduction speed is set to slow. When the reproduction speed is set to double speed, the reproduction speed setting 511 switches to a display indicating that the reproduction speed is double speed, as indicated by a reproduction speed setting 513 of the setting part 508 of effect items illustrated in FIG. 5B-2.

In step S429, the system control unit 50 determines whether the REC button 76 has been pressed. If the system control unit 50 determines that the REC button 76 has been pressed (YES in step S429), the processing proceeds to step S431. If not (NO in step S429), the processing proceeds to step S430.

In step S430, the system control unit 50 determines whether the SET button 74 has been pressed. If the system control unit 50 determines that the SET button 74 has been pressed (YES in step S430), the processing returns to step S401. If not (NO in step S430), the processing proceeds to step S431.

The processes performed in steps S431 to S442 are similar to the processes performed in steps S410 to S421. In this manner, in the present exemplary embodiment, a movie can be recorded even during the setting of an effect item. In addition, if movie recording is started in a state in which the setting part of effect items is displayed, the screen returns again to the setting screen of effect items in response to the lapse of the set recording time and the end of the movie recording. In this manner, movie recording can be started not only on the recording standby screen, but also on the setting screen. Thus, the user can quickly change an effect item, and shift to next replay recording.

According to the above-described exemplary embodiment, during the recording of a movie including a period to which a specific effect is applied, the user can identify when the period to which the specific effect is applied is recorded. In the recording of a movie in which a specific effect is applied to a part of the recording period, by timely performing recording in accordance with the period to which the specific effect is applied, a movie interesting for the user can be created. If the separator line described in the present exemplary embodiment is not displayed, the user cannot identify the period to which the specific effect is applied, and cannot identify whether the recorded movie includes the effect applied at a desired timing, until the movie is reproduced after the movie recording. Nevertheless, by displaying a progress bar to indicate when the period to which the specific effect is applied starts, the user intuitively recognizes the start of the period to which the specific effect is applied, and it becomes easier to create a desired movie. Furthermore, the user can recognize the length of the effect-applied period based on a ratio of a part in the progress bar that indicates the effect-applied period. In addition, based on the display of the progress bar, the user can intuitively recognize, after the recording start of the effect-applied period, how long does it take the recording of the effect-applied period to end. Thus, the user can carry on the recording so that the movie recording ends by the recording end of the effect-applied period. This helps the user to record a movie so that the effect is applied at a desired timing.

In addition, not by displaying a time but by changing a display appearance of a part of the progress bar that corresponds to the elapsed time from the recording start, regardless of the preset recording time, the progress degree of the recording is displayed. With this configuration, the user can recognize the elapsed time of the recording and the start or end timing of the effect-applied period more sensuously, instead of determining them based on a numerical value.

In addition, even when the start of the movie recording is set to the same timing as the start of the effect-applied period, and the effect-applied period ends before the lapse of the set recording time, by displaying a separator line, the user can recognize the effect-applied period.

In addition, the description has been given of an example in which, even when the recording mode is a recording mode other than the replay recording, an effect (change of a reproduction speed) is applied to the recorded movie, but a separator line indicating a part to which a specific effect is applied is not displayed in the progress bar. When a similar effect is applied throughout the entire recording time, a display appearance of the entire progress bar may be changed instead of displaying the separator line. More specifically, the inner part of the progress bar may be displayed in different colors depending on the reproduction speed. For example, when the reproduction speed is normal reproduction speed (1 time), the inner part of the progress bar is displayed in gray, when the reproduction speed is double speed, the inner part of the progress bar is displayed in black, and when the reproduction speed is slow, the inner part of the progress bar is displayed in white. By displaying the progress bar in this manner, the user can recognize that the entire recording time includes no partial period to which a specific effect is applied, and that the effect is applied throughout the entire recording time.

In addition, in the present exemplary embodiment, a recording period can be set to any of 4 seconds, 5 seconds, and 6 seconds. The settable recording period is not limited to these. For example, the recording period may be 10 seconds or 1 minute. In addition, even though a recording period is not preset, if a period to which a predetermined effect is applied is determined, the recording start timing of the period to which the predetermined effect is applied may be displayed. For example, the period to which the predetermined effect is applied may be preset to be started from 10 seconds after the recording start, and in response to the user issuing an end instruction, the movie recording may be ended together with the end of the period to which the predetermined effect is applied. At this time, the display length of the progress bar increases as the recording time increases, or the progress width of the progress degree becomes narrower. In addition, the end timing of the period to which the predetermined effect is applied and the movie recording end timing may not be necessarily the same timing.

In addition, in the present exemplary embodiment, as a predetermined effect, a reproduction speed effect of performing reverse double speed reproduction and slow reproduction of the last 2 seconds of the recorded movie is applied. The predetermined effect is not limited to such an effect. For example, the present invention is also effective even for other effects such as when slow reproduction of only a partial period is performed, when the color is changed, and when an image lag effect is applied. In addition, the description has been given of an example in which the predetermined effect is not applied to a period other than the last 2 seconds. The effect-applied period, however, is not limited to the last 2 seconds, and the effect may be applied to a period other than the last 2 seconds. For example, when the first several seconds correspond to a period slowly reproduced, and the last 2 seconds are reproduced with the replay effect applied, by displaying a part at which the applied effect is switched, the user can perform recording in accordance with the period to which the replay effect is applied. In addition, since a part other than the part to which the replay effect is applied is a part to which another effect is applied, for the part to which another effect is applied, the user can perform recording in accordance with the corresponding effect.

In addition, in the present exemplary embodiment, the description has been given of an example in which the separator line is drawn in the progress bar. Alternatively, by changing a display color (display appearance) of the progress bar in midstream, when the effect-applied period is recorded may be indicated. For example, in the progress bar, the display color of a part indicating a recording period of the effect-applied period may be yellow, and the display color of the other parts may be white. In addition, in the progress bar, the periphery of the part indicating the recording period of the effect-applied period may be enclosed by a yellow line, and the other parts may be enclosed by white lines.

[Modified Example of First Exemplary Embodiment]

Figure 8A:
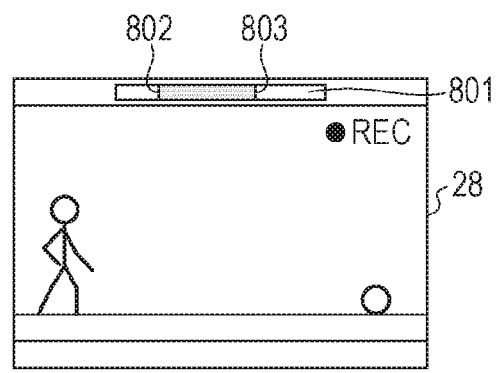
Figure 8B:
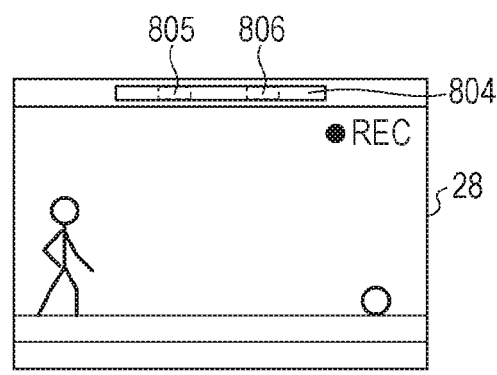

In the first exemplary embodiment, the description has been given of an example of changing, in replay recording, a reproduction speed of only one period in the recording time, i.e., the last 2 seconds. The present invention, however, is also effective for the below-described case. FIGS. 8A, 8B, 8C-1, and 8C-2 illustrate display examples during recording a movie in which a reproduction speed effect is set to replay, according to another exemplary embodiment to which the present invention is applicable. FIG. 8A illustrates a display example of a progress bar in a case where a recorded movie partially and midway includes a period to which a specific effect is applied. As in a progress bar 801 illustrated in FIG. 8A, by changing a display appearance (display color) of a part enclosed by a start position 802 and an end position 803 of the period to which the specific effect is applied, to a display appearance (display color) different from that of the other parts, the user can recognize the period to which the specific effect is applied. FIG. 8B illustrates a display example in a case where the recording time includes two effect-applied periods, i.e., a period for reverse double speed reproduction and a period for slow reproduction. Even when the recording period thus includes the two periods to which the specific effects are respectively applied, by displaying a first period 805 and a second period 806 that are enclosed by dotted lines in a progress bar 804 illustrated in FIG. 8B, the user recognize the plurality of periods to which the specific effects are respectively applied. In addition, the period to which a specific effect is applied may be displayed by changing a display color or by enclosing with dotted lines, as described above. Alternatively, the effect-applied period may be displayed in another display appearance. In addition, by displaying the effect-applied period in a display appearance different from that of a display indicating a progress degree of the recording, the user can intuitively recognize both the progress degree of the recording and the progress degree of the period to which the specific effect is applied.

Figures 1, 8C:
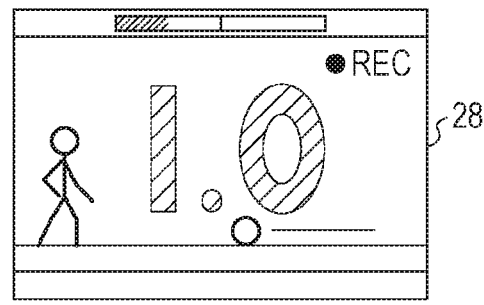
Figures 2, 8C:
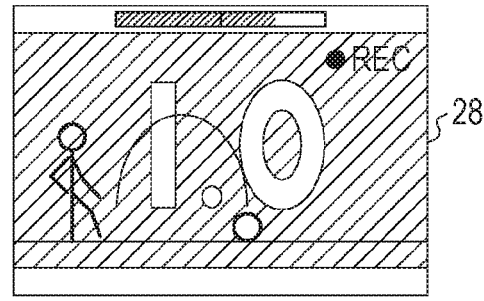

Next, the description will be given of a display indicating the period to which the specific effect is applied, using a display other than the progress bar. FIGS. 8C-1 and 8C-2 illustrate display examples in a case where a period until the effect starts is indicated by an actual time. FIG. 8C-1 indicates that 1 second is left until the period to which the specific effect is applied starts, and the time displayed on the display unit 28 gets shorter as the start of the period to which the specific effect is applied approaches. In addition, FIG. 8C-2 indicates that, in the movie recording period of the part to which the specific effect is applied, the remaining time of the period to which the specific effect is applied is 1 second. The configurations illustrated in FIGS. 8A, 8B, 8C-1, and 8C-2 are effective for a case where the display unit 28 is rotatable with respect to the main body of the digital camera 100, and recording is performed with the display unit 28 facing a subject, for example. The time until the period to which the specific effect is applied starts is displayed while being counted down (time display) in a size recognizable by the subject, as illustrated in FIG. 8C-1. Furthermore, the remaining time of the period to which the specific effect is applied is displayed while being counted down in a different display appearance, as illustrated in FIG. 8C-2. Through such displays, the user can easily recognize whether the current time point is before the period to which the specific effect is applied or during the period. The user can further recognize the time until the period to which the specific effect is applied starts and the time until the period ends.

<Second Exemplary Embodiment>

Figure 9A:
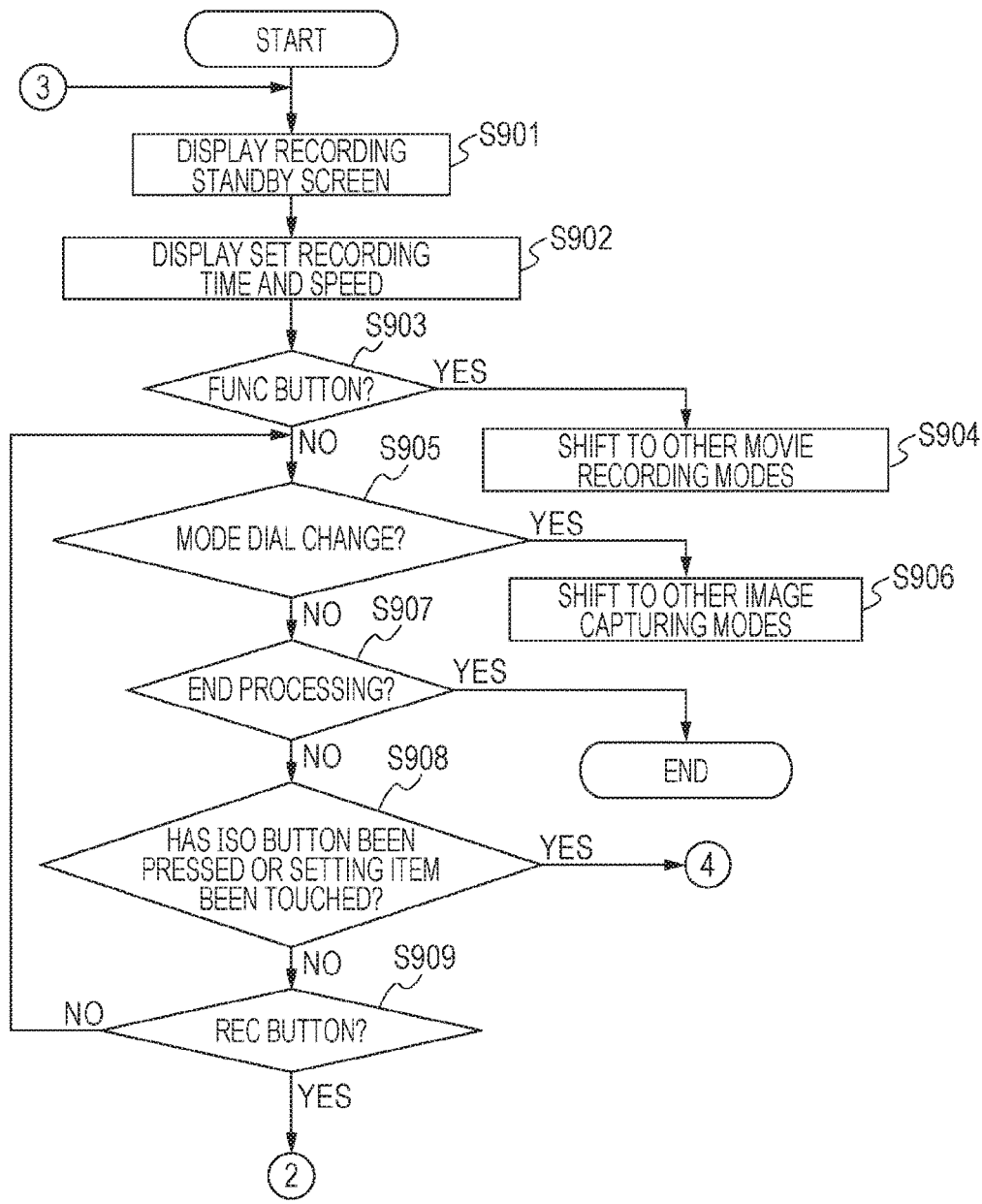
Figure 9C:
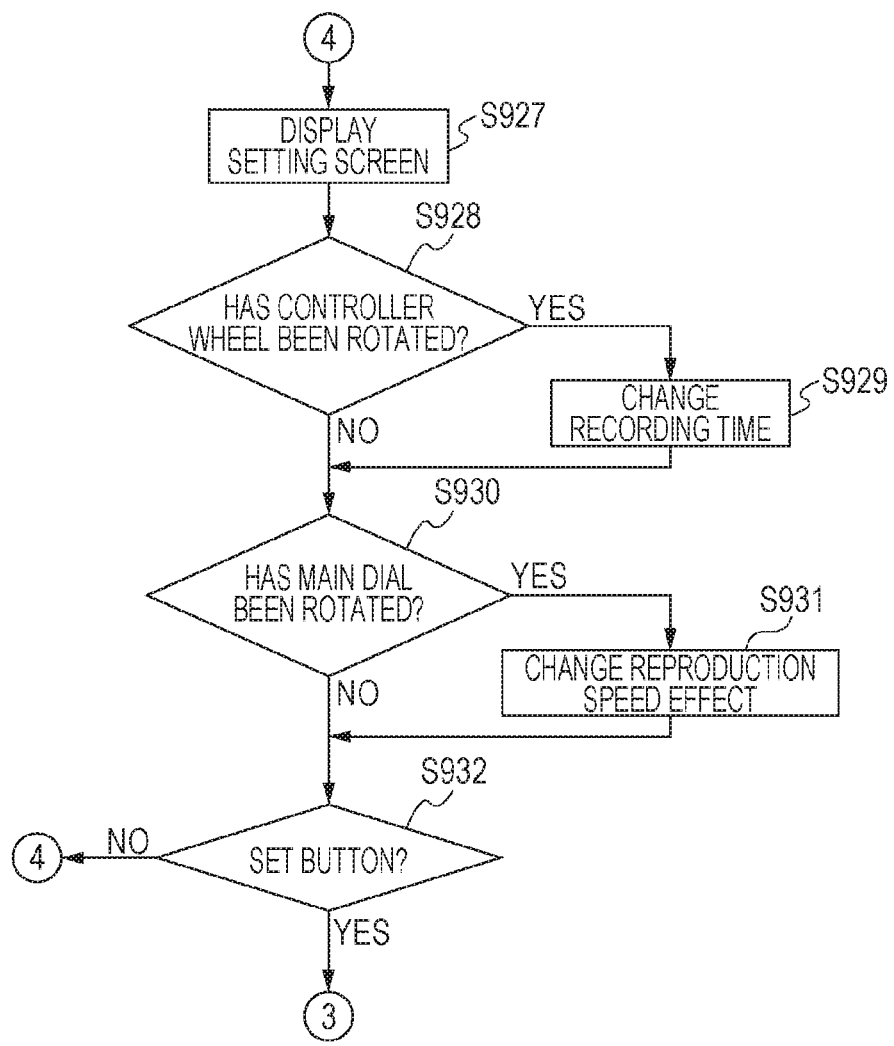

In the second exemplary embodiment, the configuration of the digital camera 100 is similar to that of the first exemplary embodiment as illustrated in FIGS. 1 and 2. In the first exemplary embodiment, a part reproduced with an effect applied is indicated by a display. In the second exemplary embodiment, the description will be given of an example in which a recording period of a part of a movie reproduced with an effect applied is indicated by sound. The present exemplary embodiment is effect for a case where a subject cannot recognize information displayed on the display unit 28, and a case where a subject records a movie while moving, instead of a photographer recording a movie in accordance with the subject. In addition, similarly to the first exemplary embodiment, the description will be given of a case where the last 2 seconds of the recording period corresponds to a recording period of a part to which reverse double speed reproduction and slow reproduction are applied. The flow of a method for notifying, by sound, the period to which the specific effect is applied will be described with reference to FIGS. 9A to 9C. Before the flow illustrated in FIGS. 9A to 9C is started, the digital camera 100 is turned on, and a movie mode is set by rotationally operating the mode dial 60. Furthermore, the FUNC button 40 is pressed, and a short clip movie recording mode is selected. Upon the selection of the short clip movie recording mode, the flow illustrated in FIGS. 9A to 9C is started. The processing is realized by loading a program recorded in the nonvolatile memory 56, into the system memory 52, and executing the program by the system control unit 50.

The processes performed in steps S901 to S911 are similar to the processes performed in steps S401 to S411 in FIG. 4A, respectively.

In step S912, the system control unit 50 starts movie recording processing, similarly to step S416 in FIG. 4B.

In step S913, the system control unit 50 determines whether a currently-set reproduction speed effect is replay. If the system control unit 50 determines that the currently-set reproduction speed effect is replay (YES in step S913), the processing proceeds to step S914. If not (NO in step S913), the processing proceeds to step S923.

In step S914, the system control unit 50 determines whether the REC button 76 has been pressed. If the system control unit 50 determines that the REC button 76 has been pressed (YES in step S914), the processing proceeds to step S925. If not (NO in step S914), the processing proceeds to step S915.

In step S915, the system control unit 50 determines whether the time until the start of the recording period of a part to which a specific effect is applied has become 2 seconds (whether t=2 seconds if the recording time is 4 seconds). If the system control unit 50 determines that it is 2 seconds before the effect starts (YES in step S915), the processing proceeds to step S916. If not (NO in step S915), the processing returns to step S914, in which the system control unit 50 waits until 2 seconds elapse, or until the REC button 76 is pressed so that the movie recording is ended.

In step S916, the system control unit 50 starts producing first sound by the sound producing unit 55. The first sound is produced for 1 second.

In step S917, similarly to step 3914, the system control unit 50 determines whether the REC button 76 has been pressed. If the system control unit 50 determines that the REC button 76 has been pressed (YES in step S917), the processing proceeds to step S925. If not (NO in step S917), the processing proceeds to step S918.

In step S918, the system control unit 50 determines whether the time until the start of the recording period of the part to which the specific effect is applied has become 1 second. If the system control unit 50 determines that it is 1 second before the effect starts (YES in step S918), the processing proceeds to step S919. If not (NO in step S918), the processing returns to step 3917, in which the system control unit 50 waits until 1 second elapses, or until the REC button 76 is pressed so that the movie recording is ended.

In step S919, the system control unit 50 starts producing second sound by the sound producing unit 55. The second sound is produced for 1 second. The second sound is produced in a form different from that of the first sound, or with a volume different from that of the first sound. For example, a sound producing form can be changed in the following manner. When certain sound is repeatedly produced at a predetermined time interval as in a self-timer, a sound producing interval is set to get shorter as the time approaches the recording start.

In step S920, similarly to step S914, the system control unit 50 determines whether the REC button 76 has been pressed. If the system control unit 50 determines that the REC button 76 has been pressed (YES in step S920), the processing proceeds to step S925. If not (NO in step S920), the processing proceeds to step S921.

In step S921, the system control unit 50 determines whether the part to which the specific effect is applied is under recording. If the system control unit 50 determines that the part to which the specific effect is applied is under recording (YES in step S921), the processing proceeds to step 3922. If not (NO in step S921), the processing returns to step S920.

In step S922, the system control unit 50 starts producing third sound by the sound producing unit 55. The third sound is produced for 2 seconds, for which the period to which the specific effect is applied is under recording. The third sound is different from the first sound or the second sound. If the first sound and the second sound are intermittently produced, the third sound may be produced for 2 seconds without any interval. Alternatively, the remaining time until the period ends may be pronounced as the third sound.

The processes performed in steps S923 to S926 are similar to the processes performed in steps S418 to S421 in FIG. 4B.

In addition, instead of producing sound, the period to which the specific effect is applied may be notified by light emission by the light emitting unit 57. More specifically, if a replay effect is set, at 2 seconds before the effect is started, light is intermittently emitted for 1 second at a predetermined interval, and at 1 second before the effect is started, light is intermittently emitted at a further shorter predetermined interval. If a notification method similar to a self-timer is employed, it becomes easier for the user to identify a time interval. In addition, during the recording of the period to which the specific effect is applied, light is continued to be emitted without any light emission interval. When the user serving as a subject recognizes the period to which the specific effect is applied, and tries to perform recording in accordance with the period to which the specific effect is applied, it is only required that the start timing is notified to the user. In addition, when light emission may affect recording, notification by sound production (sound production control) may be performed. When recording including audio is performed, notification by light emission (light emission control) may be performed.

According to the above-described exemplary embodiment, in the recording of a movie including a period to which a specific effect is applied, the user can recognize when the period to which the specific effect is applied is recorded. In the recording of a movie in which a specific effect is applied to a part of a recording period, by performing recording in accordance with the period to which the specific effect is applied, a movie interesting for the user can be created. If the effect-applied period is not notified, the user cannot identify the period to which the specific effect is applied, and cannot identify whether the recorded movie includes a desired effect, until the movie is reproduced after the movie recording. Nevertheless, by notifying when the period to which the specific effect is applied starts by changing a notification method, the user intuitively recognizes the start of the period to which the specific effect is applied, and it becomes easier for the user to create a desired movie without missing the effect-applied timing. Thus, it becomes easier for the user to record a movie so that an effect is applied at a desired timing.

In addition, also in the second exemplary embodiment, a progress bar and a separator line may be displayed similarly to the first exemplary embodiment.

In addition, as for the notification by light emission, in the recording of a movie including a period to which a specific effect is applied, the user can similarly identify when the period to which the specific effect is applied is recorded.

In addition, in the above-described exemplary embodiment, the description has been given of an example in which notification is performed for a movie recorded by the digital camera 100. The present invention, however, is not limited to this, and is also effective for a case where remote image capturing is performed. More specifically, when image capturing performed by a distantly-located image capturing apparatus is checked via a display panel or the like, if an effect-applied period is identified, image capturing can be controlled, and an instruction can be issued to a subject.

In addition, the predetermined effect does not include an effect applied at the end of a movie for indicating that the single movie has ended (such an effect is not to be notified using a separator line, sound production, or light emission. Examples of such an effect include fade-out and shutter animation. When an effect indicating a movie end is applied, a display indicating a period to which the above-described effect is applied is not provided. The display of the above-described separator line enables a movie to be recorded in accordance with a predetermined period to which a desired effect is applied in the recording time. Such a display is different from a display indicating a recording end.

In addition, control of the electronic apparatus may be performed by a single hardware component. Alternatively, a plurality of hardware components may share processes, thereby controlling the entire apparatus.

In addition, the present invention has been described in detail based on preferred exemplary embodiments thereof. The present invention, however, is not limited to these specific exemplary embodiments, and various configurations without departing from the gist of the present invention are included in the present invention. Furthermore, each exemplary embodiment described above merely indicates an exemplary embodiment of the present invention, and the exemplary embodiments may be appropriately combined.

In addition, in the above-described exemplary embodiment, the description has been given of an example case where the present invention is applied to the digital camera 100. The present invention, however, is not limited to this example, and is applicable to any electronic apparatus as long as the electronic apparatus can notify a timing at which a specific effect is applied in movie recording. In other words, the present invention is applicable to a portable phone terminal, a portable image viewer, a printer apparatus having a viewfinder, a digital photo frame, a music player, a game apparatus, an electronic book reader, and the like.

(Other Exemplary Embodiments)

The present invention is also realized by executing the following processing. More specifically, the processing is executed in such a manner that software (a program) for realizing the functions of the above exemplary embodiments is supplied to a system or an apparatus via a network or various recording media, and a computer (or a central processing unit (CPU), a micro processing unit (MPU), or the like) of the system or the apparatus reads and executes a program code. In this case, a program and a storage medium storing the program constitute the present invention.

According to the present invention, the user can easily recognize, during the recording of a movie to which a predetermined effect is intended to be applied, a time point at which an effect-applied part starts or ends.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-263040, filed Dec. 25, 2014, which is hereby incorporated by reference herein in its entirety.

What is claimed is:

1. An electronic apparatus comprising:
   an image capturing control unit configured to perform control to record a movie captured by an image capturing unit and including a first recording period to which a specific effect is applied and a second recording period to which the specific effect is not applied, the second recording period being a period contiguous to the first recording period, in one recording period; and
   a display control unit configured to perform control to display, during recording the movie, an information display related to a time point at which the first recording period switches to the second recording period or a time point at which the second recording period switches to the first recording period with a live view image.

2. The electronic apparatus according to claim 1, wherein the information display is a bar display indicating the switching time point and an elapsed time from a recording start of a movie.

3. The electronic apparatus according to claim 2, wherein the bar display is a display indicating a ratio of an elapsed time from a recording start of the movie until a predetermined recording time of the movie.

4. The electronic apparatus according to claim 1, wherein the information display is a time display.

5. The electronic apparatus according to claim 1, wherein the specific effect is an effect for making a reproduction speed of a recorded movie different from that in reproduction in a case where the specific effect is not applied.

6. The electronic apparatus according to claim 1, wherein the specific effect is reverse reproduction.

7. The electronic apparatus according to claim 2, wherein a switching time point between the first recording period and the second recording period is indicated by a line separating the bar display.

8. The electronic apparatus according to claim 1, wherein the specific effect is an effect applied to a movie recorded in a last predetermined period of a recording time.

9. The electronic apparatus according to claim 1,
   wherein the display control unit is capable of displaying a setting screen for setting a recording time, and a standby screen for receiving a start instruction of a movie,
   wherein, the display control unit is configured to perform control, in a case where a recording start instruction of the movie is received when the setting screen is displayed, to display the setting screen in response to a recording end of the movie, and
   in a case where a recording start instruction of a movie is received when the standby screen is displayed, to display the standby screen in response to a recording end of the movie.

10. The electronic apparatus according to claim 1, wherein, in a case where a stop instruction on recording a movie is received before a predetermined time elapses, the image capturing control unit is configured to perform control not to display the information display, and to continue recording of the movie until the predetermined time elapses.

11. The electronic apparatus according to claim 1, wherein the display control unit is configured to control not to display the information display for a period to which an effect for indicating an end of the movie is applied.

12. An electronic apparatus comprising:
   an image capturing control unit configured to perform control to record a movie captured by an image capturing unit and including a first recording period to which a specific effect is applied and a second recording period to which the specific effect is not applied, the second recording period being a period contiguous to the first recording period, in one recording period; and a sound production control unit configured to perform control on, during recording the movie and displaying a live view image, notification corresponding to a time point at which the first recording period switches to the second recording period or a time point at which the second recording period switches to the first recording period by producing sound.

13. An electronic apparatus comprising:

an image capturing control unit configured to perform control to record a movie captured by an image capturing unit and including a first recording period to which a specific effect is applied and a second recording period to which the specific effect is not applied, the second recording period being a period contiguous to the first recording period, in one recording period; and a light emission control unit configured to perform control on, during recording the movie and displaying a live view image, notification corresponding to a time point at which the first recording period switches to the second recording period or a time point at which the second recording period switches to the first recording period.

14. The electronic apparatus according to claim 12, wherein the notification is performed before the first recording period starts.

15. A control method of an electronic apparatus, the method comprising:

an image capturing control step of performing control to record a movie including a first recording period to which a specific effect is applied and a second recording period to which the specific effect is not applied, and the second recording period is a period contiguous to the first recording period, in one recording period; and a display control step of performing control to display, during recording a movie, an information display related to a time point at which the first recording period switches to the second recording period or a time point at which the second recording period switches to the first recording period, during recording the movie.

16. A control method of an electronic apparatus, the method comprising:

an image capturing control step of performing control to record a movie including a first recording period to which a specific effect is applied and a second recording period to which the specific effect is not applied, and the second recording period is a period contiguous to the first recording period, in one recording period; and a sound production control step of performing control on, during recording a movie, notification corresponding to a time point at which the first recording period switches to the second recording period or a time point at which the second recording period switches to the first recording period, during recording the movie, by producing sound.

17. A control method of an electronic apparatus, the method comprising:

an image capturing control step of performing control to record a movie including a first recording period to which a specific effect is applied and a second recording period to which the specific effect is not applied, and the second recording period is a period contiguous to the first recording period, in one recording period; and a light emission control step of performing control on, during recording a movie, notification corresponding to a time point at which the first recording period switches to the second recording period or a time point at which the second recording period switches to the first recording period, during recording the movie, by light emission.

18. A non-transitory computer-readable storage medium storing a program for executing the method according to claim 15.

19. A non-transitory computer-readable storage medium storing a program for causing a computer to function as each unit of the electronic apparatus according to any one of claim 16.

20. A non-transitory computer-readable storage medium storing a program for causing a computer to function as each unit of the electronic apparatus according to claim 17.

21. The electronic apparatus according to claim 1, wherein the second recording period is started without an image capturing instruction after the first recording period.

22. The electronic apparatus according to claim 1, further comprising an image capturing unit configured to capture an image of a subject.

* * * * *